(12) United States Patent
Stevens et al.

(10) Patent No.: US 11,100,460 B2
(45) Date of Patent: Aug. 24, 2021

(54) LAYER BOARD FLOW MECHANISM FOR REPLENISHMENT OF A PICKING SYSTEM

(71) Applicant: Dematic Corp., Grand Rapids, MI (US)

(72) Inventors: Criston S. Stevens, Layton, UT (US); Christopher Blackburn, Brookfield, WI (US); Paul K. Gines, Kaysville, UT (US); Max Weston, Layton, UT (US)

(73) Assignee: Dematic Corp., Grand Rapids, MI (US)

( * ) Notice: Subject to any disclaimer, the term of this patent is extended or adjusted under 35 U.S.C. 154(b) by 201 days.

(21) Appl. No.: 16/361,892

(22) Filed: Mar. 22, 2019

(65) Prior Publication Data
US 2019/0303844 A1 Oct. 3, 2019

Related U.S. Application Data

(60) Provisional application No. 62/649,663, filed on Mar. 29, 2018, provisional application No. 62/648,649, filed on Mar. 27, 2018.

(51) Int. Cl.
*G06Q 10/08* (2012.01)
*B65G 1/04* (2006.01)

(52) U.S. Cl.
CPC .......... *G06Q 10/087* (2013.01); *B65G 1/0492* (2013.01)

(58) Field of Classification Search
CPC combination set(s) only.
See application file for complete search history.

(56) References Cited

U.S. PATENT DOCUMENTS

| 7,510,066 | B2 | 3/2009 | Goffredo et al. |
| 9,120,621 | B1* | 9/2015 | Curlander .......... G06K 9/00771 |
| 2008/0047909 | A1 | 2/2008 | Hamaji et al. |
| 2010/0089941 | A1 | 4/2010 | Connier et al. |
| 2010/0316469 | A1* | 12/2010 | Lert .......... B65G 1/10 414/273 |
| 2011/0144798 | A1* | 6/2011 | Freudelsperger .... B65G 1/1378 700/218 |
| 2017/0334696 | A1 | 11/2017 | Otto et al. |

OTHER PUBLICATIONS

International Search Report and Written Opinion of the International Searching Authority from corresponding Patent Cooperation Treaty Application No. PCT/IB2019/052362, dated Sep. 27, 2019.

* cited by examiner

*Primary Examiner* — Kyle O Logan
(74) *Attorney, Agent, or Firm* — Gardner, Linn, Burkhart & Ondersma LLP

(57) ABSTRACT

A system for replenishing a pick face includes a storage and retrieval machine (SRM) that traverses an aisle of a warehouse and monitors a replenishment position of each pick location of a pick face. The SRM transmits a message to the system indicating which ones of the replenishment positions are empty. The SRM delivers a replenishment load to a pick location that is indicated as empty in the message. Each pick location includes a flow lane configured to direct the motion of package loads sliding down to a picking position of the pick face. The flow lane includes a lever arm assembly that constrains and brakes the motion of package loads sliding down the flow lane. A bar stop of the lever arm assembly constrains a replenishment load, while a retainer bar of the lever arm assembly constrains a forward load. The replenishment load is behind the forward load.

28 Claims, 19 Drawing Sheets

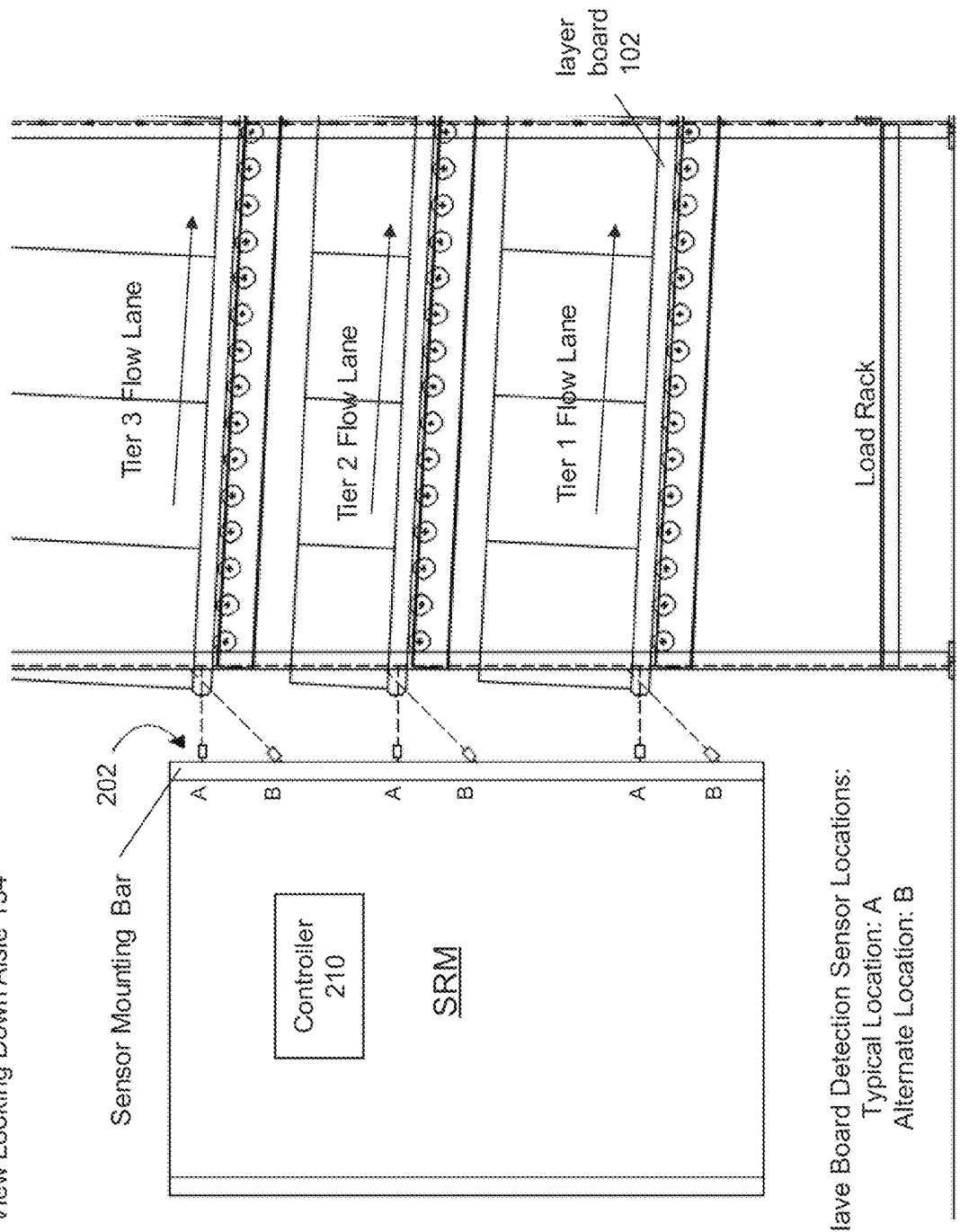

FIG. 5

Example of a tag for a pick face tier:

Pick locations 1-30

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Tag 1 Tier 1 Left | L | L | L | L | L | L | L | L | L | E | L | L | L | L | L | L | L | L | L | L | L | L | L | L | L | L | L | L | L | L |
| Tag 2 Tier 2 Left | L | L | L | L | E | L | L | L | L | L | L | L | L | L | L | L | L | L | L | L | L | L | L | L | L | L | L | L | L | L |
| Tag 3 Tier 3 Left | L | L | L | L | L | L | L | L | L | L | L | L | L | L | L | L | L | L | L | L | L | L | L | L | L | L | L | L | L | L |
| Tag 4 Tier 1 Right | L | L | L | L | L | L | L | L | L | L | L | L | L | L | L | L | L | L | L | L | L | L | L | L | L | L | L | L | L | L |
| Tag 5 Tier 2 Right | L | E | L | L | L | L | L | L | L | L | L | L | L | L | L | L | L | L | L | L | L | L | L | L | L | L | L | L | L | L |
| Tag 6 Tier 3 Right | L | L | L | L | L | L | L | L | L | L | L | E | L | L | L | L | L | L | L | L | L | L | L | L | L | L | L | L | L | L |

The tags (1-6) indicate (with an "E") that the following pick locations are not occupied and therefore require replenishment:

- Pick location 10, Tier 1, Left Side
- Pick location 5, Tier 3, Left Side
- Pick location 2, Tier 3, Right Side
- Pick location 12, Tier 3, Right Side

FIG. 7A

| Min | Max | Time Stamp Since Last Clear |
|---|---|---|
| 1 | 14 | 08:15 1/26/2018 |

FIG. 7B

| Min | Max | Time Stamp Since Last Clear |
|---|---|---|
| 1 | 21 | 08:15 1/26/2018 |

FIG. 7C

| Min | Max | Time Stamp Since Last Clear |
|---|---|---|
| 1 | 30 | 08:15 1/26/2018 |

| Min | Max | Time Stamp Since Last Clear |
|---|---|---|
| 0 | 0 | 08:22 1/26/2018 |

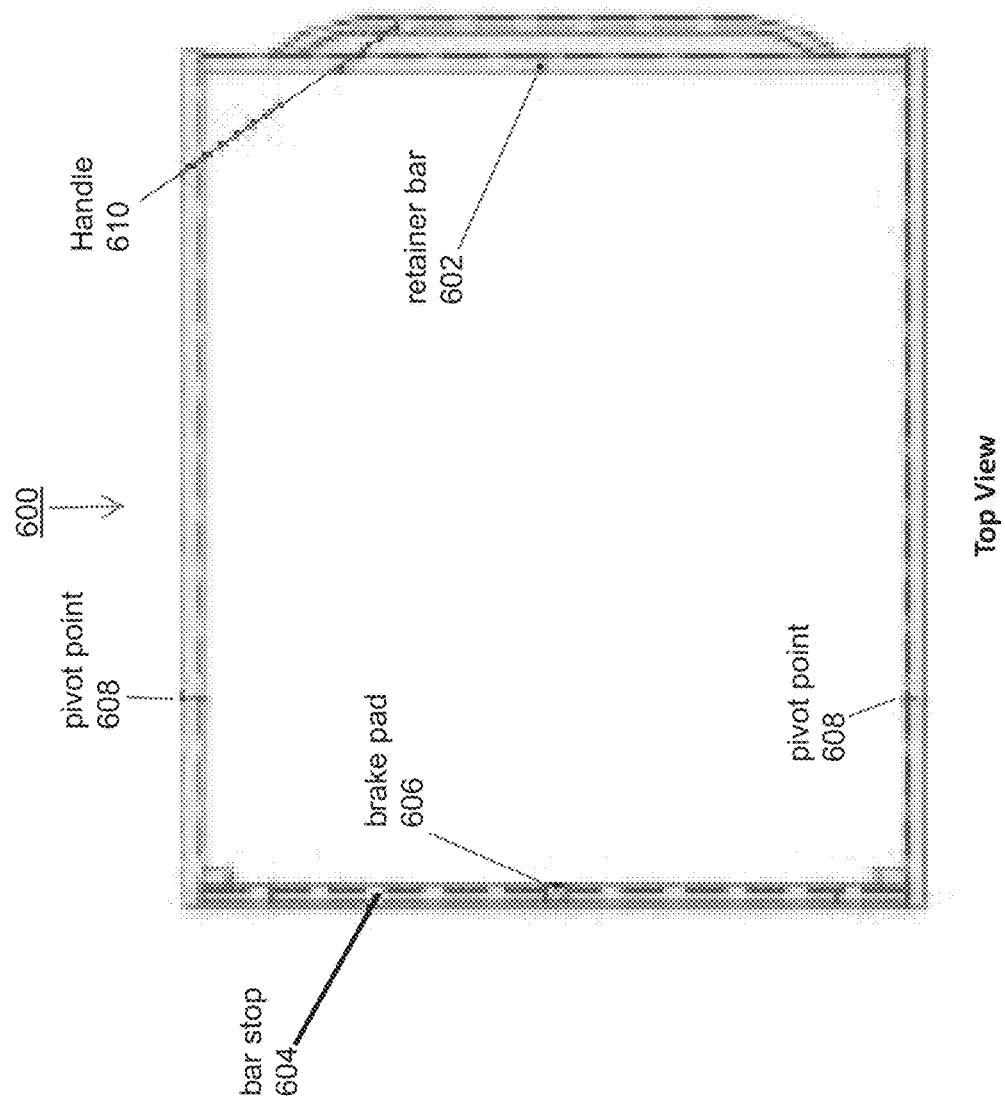

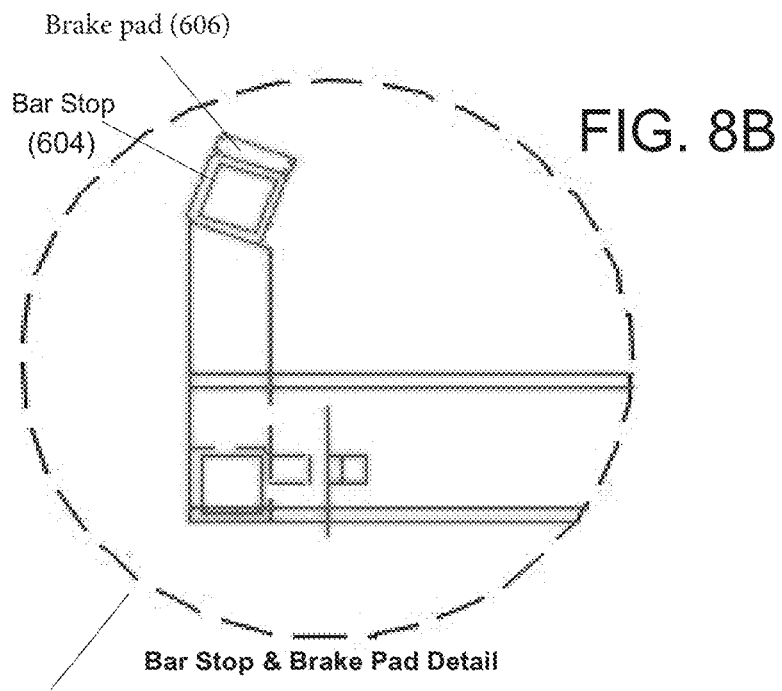
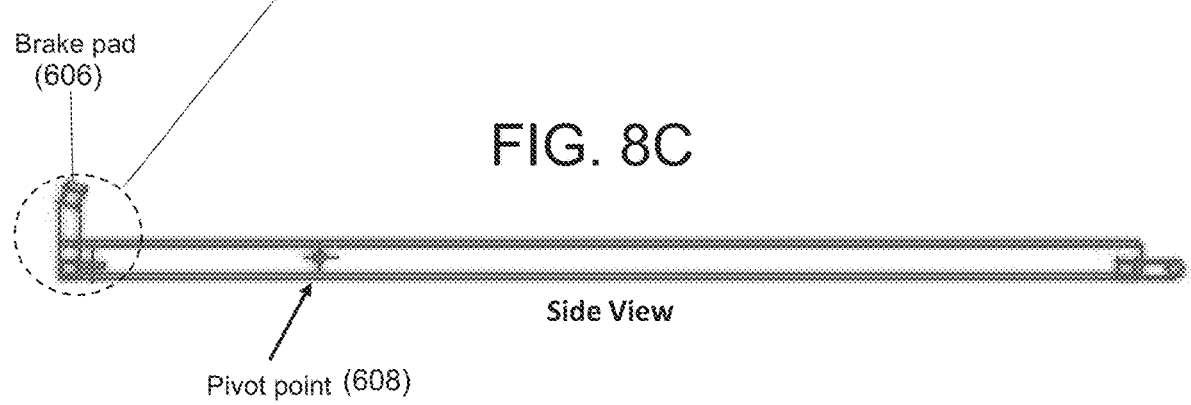
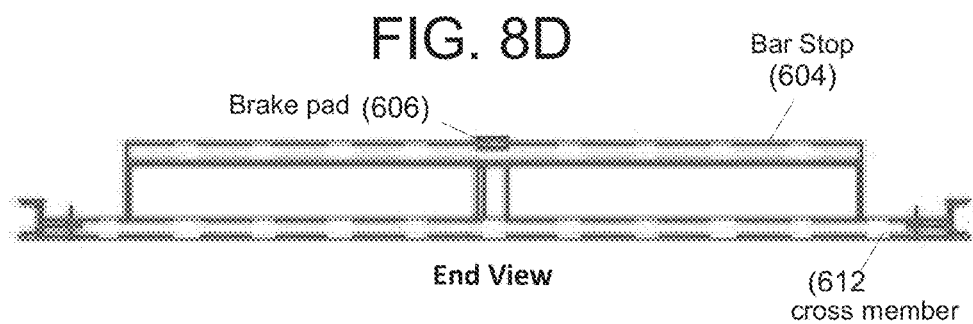

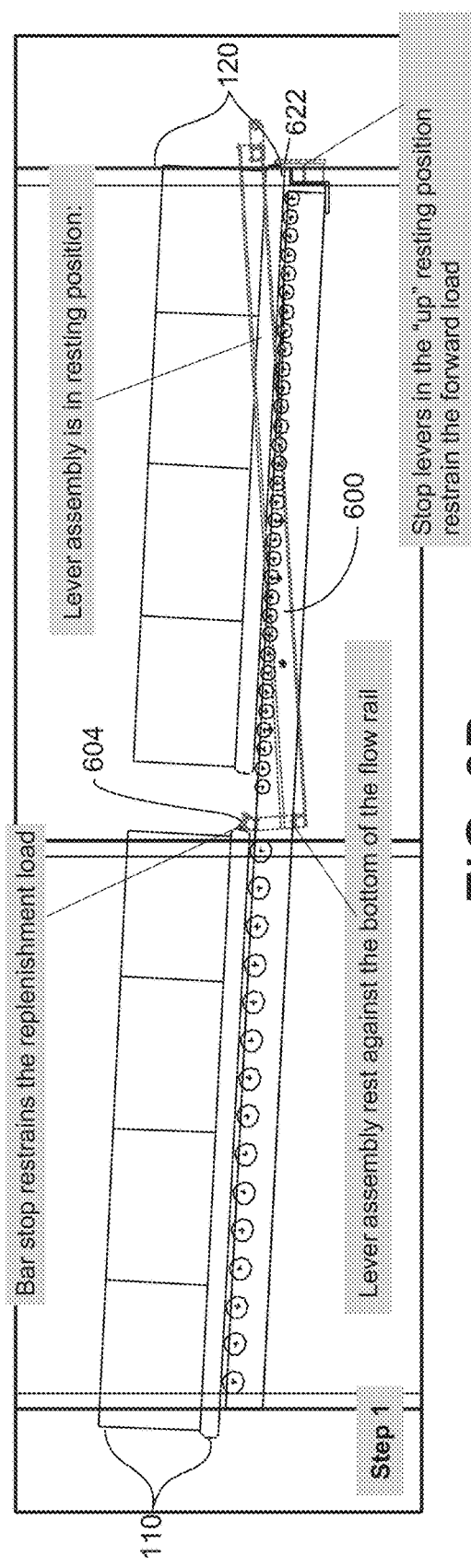
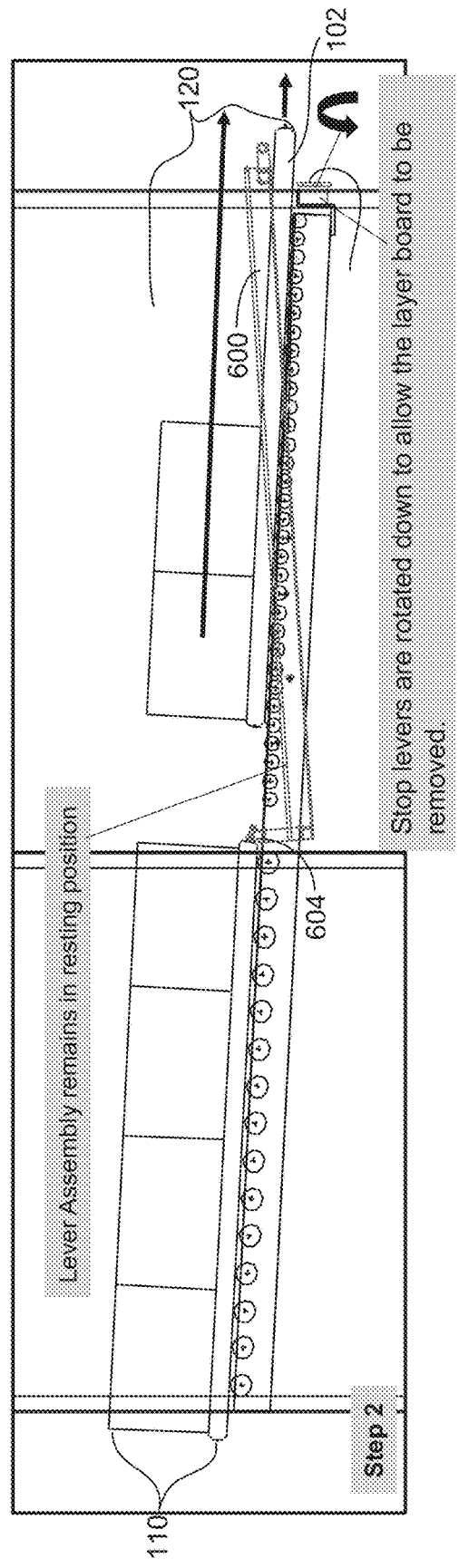

Sequence of Operation

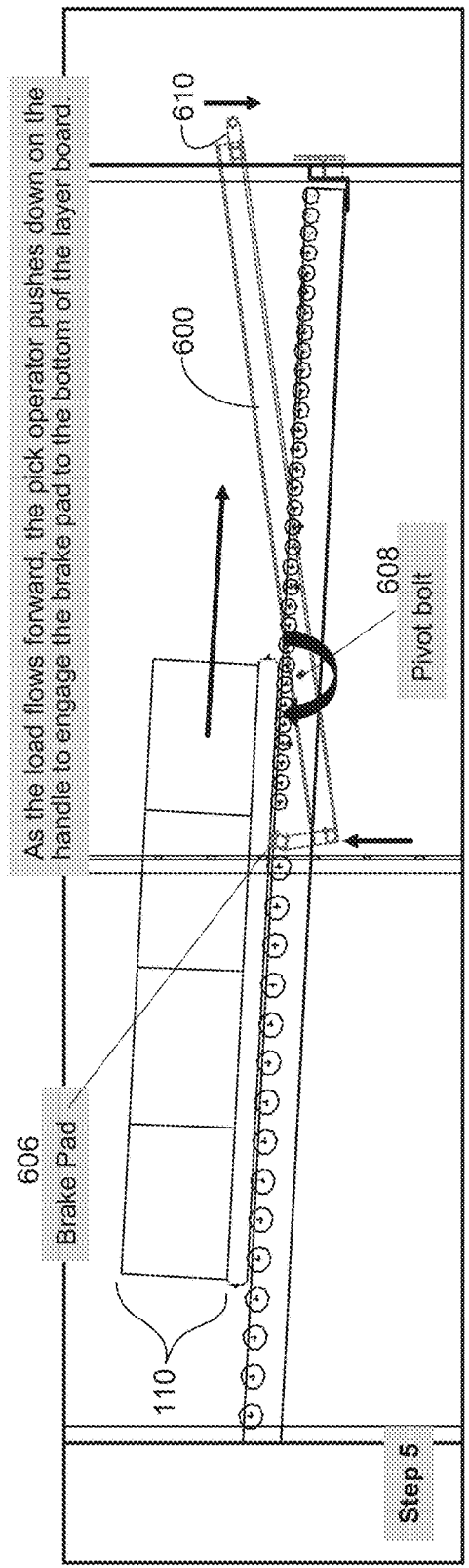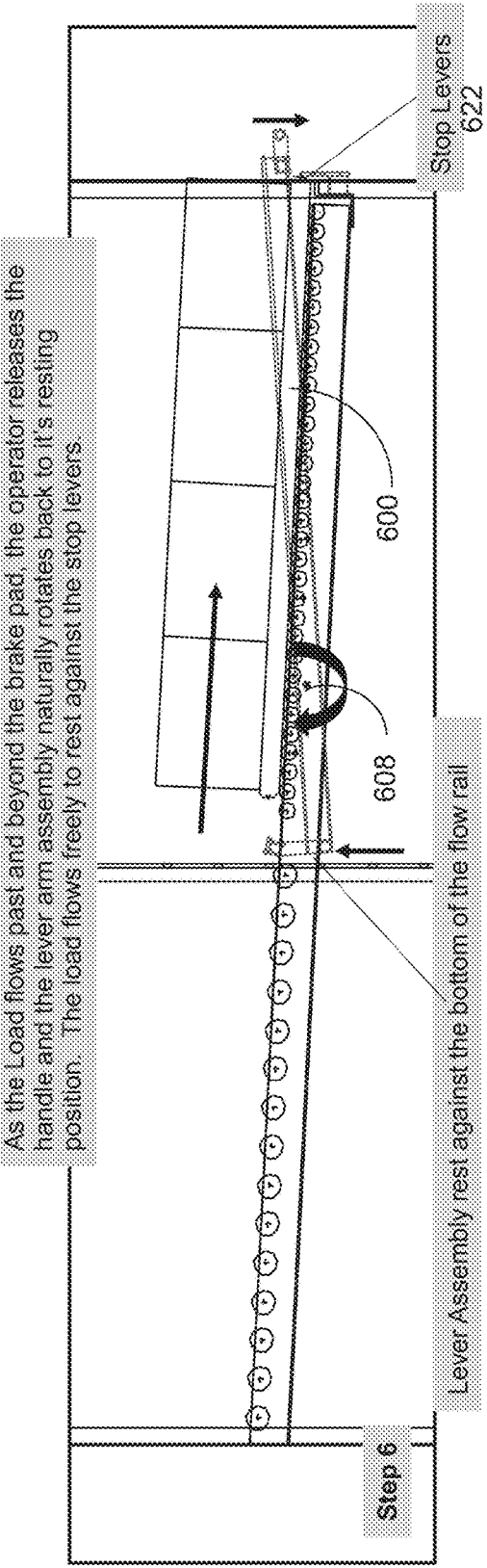

LAYER BOARD FLOW MECHANISM FOR REPLENISHMENT OF A PICKING SYSTEM

CROSS REFERENCE TO RELATED APPLICATIONS

The present application claims the filing benefits of U.S. provisional applications, Ser. No. 62/648,649, filed Mar. 27, 2018, and Ser. No. 62/649,663, filed Mar. 29, 2018, which are all hereby incorporated by reference herein in their entireties.

FIELD OF THE INVENTION

The present invention is directed to an automated storage and retrieval system (ASRS) having pick faces, and, in particular, to replenishing the pick faces and controlling the movement of products through the pick face.

BACKGROUND OF THE INVENTION

Automated storage and retrieval systems (ASRS) provide for automated receiving, putting away, and retrieving of inventory within a warehouse. Inventory (goods/products) arrive at the warehouse and are stored in defined locations within the warehouse. Typically, goods/products are stacked as packages in storage racks for later retrieval by the ASRS system. Order fulfillment within the warehouse may be accomplished by the ASRS retrieving the previously stored packages and placing those packages into pick faces where tiered racks of flow stations direct the packages into picking positions for picking by an operator. A conventional storage system may utilize layer boards (also known as slave boards, pallet support boards, or system boards) that are stacked with layers of packages. These reusable layer boards and their packages form "loads" that may be stored within the storage racks of the ASRS and later retrieved for delivery to the flow stations that supply products to the pick faces which are accessed by operators working in order pick isles.

Loads of packages placed into the flow stations of the pick faces may then be accessed for required order fulfilment. Maintaining a constant supply of packages at the pick face is a critical need. A constant supply of packages at the pick face requires resupply or replenishment from the loads of packages stored in the ASRS system. Safe and efficient control of those goods/products in the flow stations at the pick face are also critical.

SUMMARY OF THE INVENTION

The present invention provides for a load management system configured to supply/replenish pick locations of a pick face. Exemplary embodiments of the present invention provide for the monitoring of flow stations of the pick locations which are replenished when a new load of packages of particular goods/product is required at a given pick location. When an operator has picked all of the packages of goods/product from a forward, picking position at a particular pick location of the pick face, the operator will release a load of packages that was held in a back-up or replenishment position (behind the picking position) such that the released load of packages will move into the forward, picking position at that particular pick location of the pick face. This will empty the back-up (replenishment) position of that particular pick location. Using sensors, a storage and retrieval machine (SRM) monitors the back-up, replenishment positions of the pick locations of the pick face as it travels the SRM isle moving from pick location to pick location. When the SRM detects an empty backup position at a pick location, the SRM will report that pick location to a warehouse control system. The warehouse control system will select a load of packages of the correct product for that pick location and direct the SRM to deliver the selected load to the back-up position at that pick location.

In one form of the present invention, a warehouse control system configured to replenish a pick face includes a storage and retrieval machine (SRM) configured to traverse an aisle of the warehouse and configured to monitor a replenishment position of each pick location of the pick face as the SRM traverses down the aisle from pick location to pick location. The SRM is configured to transmit a load present/not present message to the warehouse control system indicating which ones of the replenishment positions of the plurality of pick locations are empty. The SRM is configured to deliver, as directed or commanded by the warehouse control system, a replenishment load package comprising a plurality of packages on a layer board to a pick location that is indicated as empty in the message.

In another form of the present invention, a method is provided for replenishing a pick face of a warehouse system. The method includes traversing, with a storage and retrieval machine (SRM), an aisle of the warehouse, such that the SRM passes from pick location to pick location of the pick face as the SRM traverses the aisle. The SRM also monitors a replenishment position of each pick location of the pick face as the SRM traverses down the aisle from pick location to pick location. A load present/not present message is transmitted to a warehouse control system indicating which ones of the replenishment positions of the plurality of pick locations are empty. The method further includes delivering, with the SRM, a replenishment load package comprising a plurality of packages on a layer board to a pick location that is indicated as empty in the message.

In an aspect of the present invention, one or more photo eyes are affixed to the SRM for monitoring back-up, replenishment positions of pick locations. In a further aspect of the present invention, the one or more photo eyes are affixed to a supporting frame of the SRM, such that the one or more photo eyes are each at a fixed height to monitor a particular pick location tier. In a further aspect of the present invention, an exemplary pick location has two or more tiers to be monitored and restocked as needed. In a further aspect of the present invention, cameras or other vision sensors may be used.

In yet a further aspect of the present invention, the layer boards and pick locations are configured such that an end portion or edge of a layer board in the back-up position extends out into the SRM isle. A photo eye of the SRM determines a load is in a back-up position of a particular pick location by sensing the protruding layer board (in a back-up position) at that particular pick location.

The present invention provides for a load management system configured to supply a pick face. Exemplary embodiments of the present invention provide for braking and control of loads placed onto loading racks with flow lanes to picking position(s) of the pick face. In one form of the present invention, a load management system comprises a first tier comprising a flow lane. The flow lane comprises rollers configured to roll under and direct the motion of package loads sliding down the flow lane to a picking position of the pick face. A package load includes a plurality of packages resting on a layer board. The first tier further comprises a lever arm assembly configured to selectively constrain and brake the motion of package loads sliding down the flow lane. The flow lane is configured to constrain a replenishment load that is constrained in position by the lever arm assembly, and further configured to constrain a forward load that is held in position by the lever arm assembly. The forward load is in the picking position and individual packages of the forward load are in position for picking by an operator. The replenishment load position is behind the forward load position.

In another form of the present invention, a method is provided for controlling and braking package loads delivered by a load management system to loading racks of a pick face. A package load includes a plurality of packages resting on a layer board. The method includes delivering at least one package load to a first tier of a loading rack. The first comprises a flow lane, and the flow lane comprises rollers configured to roll under and direct the motion of the at least one package load sliding down the flow lane to a picking position of the pick face. The method further includes selectively constraining, with a lever arm assembly of the first tier, a first load in a replenishment position, and selectively constraining, with the lever arm assembly, a second load in a forward position that is at the picking position. Individual packages of the second load in the forward position are in position for picking by an operator. The replenishment position is behind the forward position.

In another form of the present invention, the lever arm assembly comprises a retainer bar configured to constrain the forward load in position and a bar stop configured to constrain the replenishment load in position. The bar stop includes a brake pad configured to brake the replenishment load.

In yet another form of the present invention, the lever arm assembly includes a handle. When the forward load has been removed from the flow lane, lifting up the handle rotates the bar stop of the lever arm assembly out of the way of the replenishment load and allows the replenishment load to flow freely forward down the flow lane and towards the forward position.

In still another form of the present invention, when the replenishment load is flowing forward across the brake pad, pushing down on the handle of the lever arm assembly pushes the brake pad against the underside of the layer board of the replenishment load and controls the descent of the replenishment load down the flow lane and towards the forward position.

In an aspect of the present invention, the lever arm assembly includes a pivot that pivotally mounts the lever arm assembly at a location that ensures that the lever arm assembly returns to a resting position due to gravity when not being manually manipulated.

In yet another aspect of the present invention, the load management system further includes a second tier and a third tier, each comprising a corresponding flow lane. The second tier may be above the first tier, while the third tier is above the second tier.

In another aspect of the present invention, a first height clearance between the first tier and the second tier may be shorter than a second height clearance between the second tier and the third tier.

These and other objects, advantages, purposes and features of the present invention will become apparent upon review of the following specification in conjunction with the drawings.

BRIEF DESCRIPTION OF DRAWINGS

FIG. 2 is a front plane view of an SRM positioned with respect to the double deep flow stations of FIG. 1A, such that the SRM is positioned to monitor a replenishment position of each pick location according to an embodiment of the present invention;

FIGS. 5 and 6 illustrate the contents of tier status tag messages describing the status of pick face tiers for each pick location of the pick face tiers according to an embodiment of the present invention;

FIGS. 7A, 7B, and 7C illustrate a process for updating data structures for recording minimum and maximum pick location numbers for a given period of time according to an embodiment of the present invention;

FIGS. 8A, 8B, 8C, and 8D are schematic diagrams of a lever arm assembly according to an embodiment of the present invention;

FIGS. 9A, 9B, 10A, 10B, 11A, and 11B are sets of side plan views of the loading racks illustrating a sequence of operation according to an embodiment of the present invention;

DETAILED DESCRIPTION

Figure 1A:
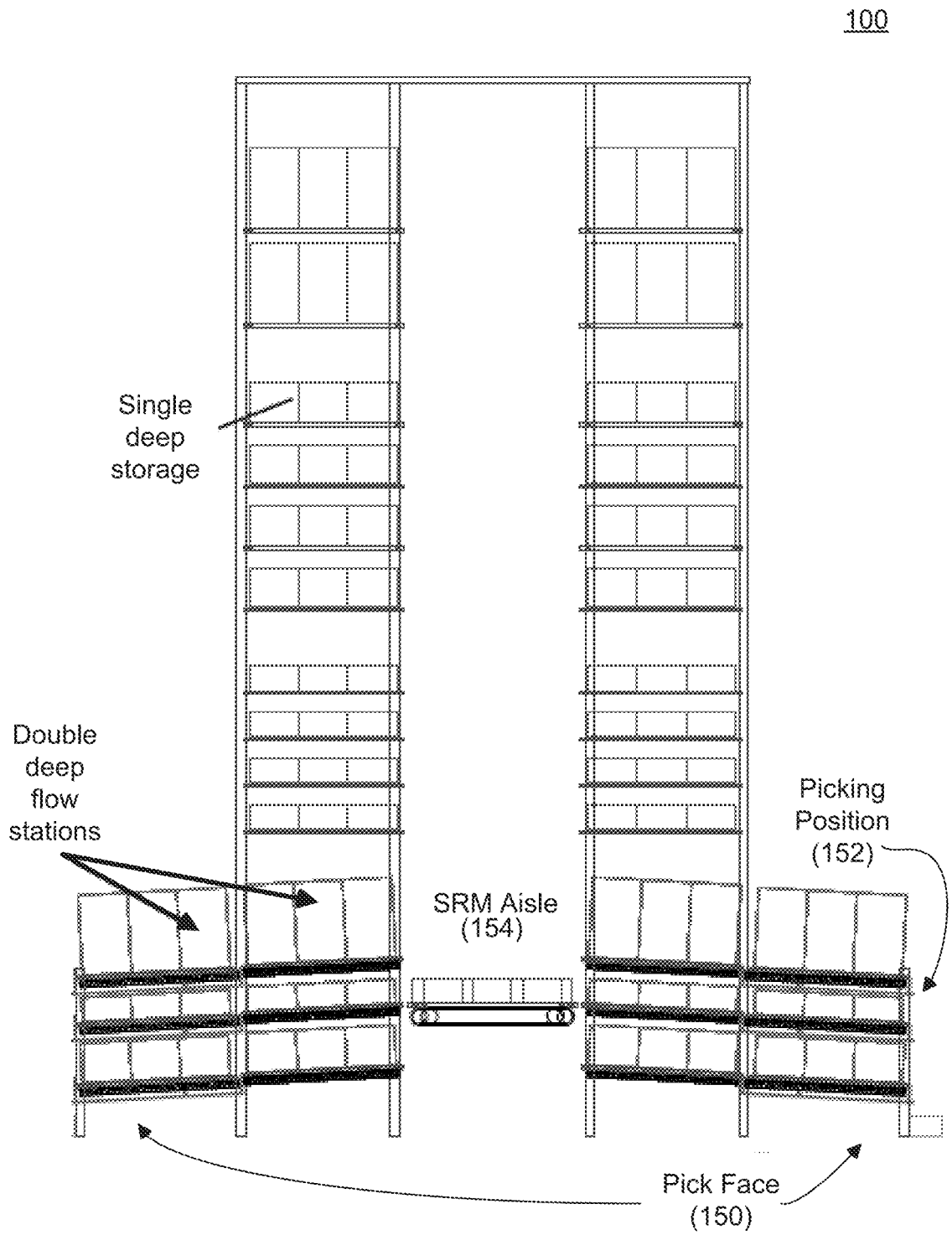
FIG. 1A is a front plane view of an order fulfillment system illustrating opposing pick faces served by double deep flow stations and corresponding storage racks positioned above the flow stations, with a storage and retrieval machine (SRM) positioned therebetween, according to an embodiment of the present invention.
Figure 1B:
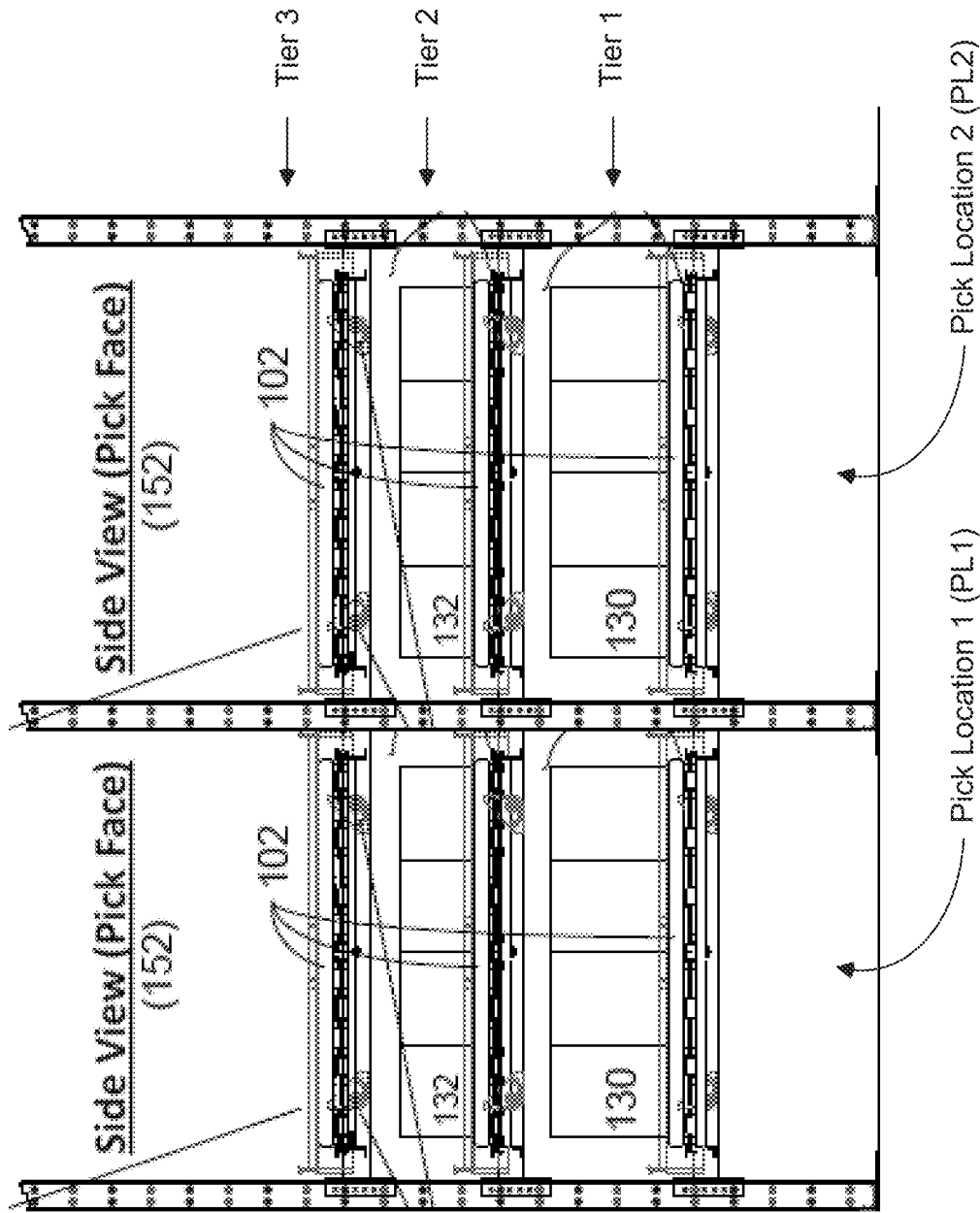
FIG. 1B is a side plane view of a portion of the order fulfillment system of FIG. 1A illustrating a pair of pick locations of a pick face according to an embodiment of the present invention.

Referring now to the drawings and the illustrative embodiments depicted therein, an automated storage and retrieval system (ASRS) is illustrated in FIG. 1A. One or more multi-tiered flow stations 150 supply individual loads made up of inventory (packages) 130, 132 of inventory (goods/product) supported by reusable layer boards 102 to the pick face side 152 of the ASRS 100. Operators in a pick isle are able to access the packages 130, 132 at the picking position 152 of the pick face 150 of the ASRS 100. As illustrated in FIG. 1A, while storage positions above the flow stations are single deep, that is, only holding a single layer board 102 and its packages 130, 132, the multi-tiered flow stations of the pick face 150 are double deep positions that accommodate two loads in each tier (or level) of the flow station. As also illustrated in FIG. 1B, each layer board 102 contains a single layer of packages 130, 132. As further illustrated in FIG. 1B, the pick position 152 of the pick face 150 is divided into a number of pick locations, e.g., pick location 1, and pick location 2 (hereinafter "PL1," and "PL2," respectively), with each pick location further divided into a particular number of levels or tiers. The pick locations may also be referred to as bays, or other terms meant to imply differentiation between the locations/positions along the pick face. Other layer configurations are also possible. Furthermore, other ASRS and storage configurations are also possible with double deep, triple deep, or even deep lane positions.

Layer boards 102 may come in a variety of configurations. For example, a layer board 102 may be a plastic platform that is configured to hold or support a variety of loads (inventory packages). Layer boards 102 may be made of plywood or other materials suitable for stacking loads thereupon. In one embodiment of the present invention, an exemplary 1×44×52-inch layer board has a maximum load weight of 550 pounds. In another embodiment, an exemplary 1.5×40×48-inch layer board has a maximum load weight of 600 pounds. Furthermore, an exemplary replenishment system will work on other boards as well, such as in a system that moves standard palletized loads to pick faces.

The exemplary auto replenishment system may also be used in standard full pallet flow lanes, as well as in more conventional pick tunnels. The auto replenishment system described herein may also be applied to any system where loads move forward to pick positions and require replenishment.

In an exemplary embodiment, illustrated in FIGS. 1A and 1B, as operators/pickers move along the ASRS system picking orders, they pick from the first one or two rows of packages from the pick position 152 of the pick face 150. As the packages become hard to reach and are no longer at the pick position 152, the operator may lower a layer stop mechanism that allows the operator to remove the layer board 102 under the packages 130, 132 at the forward position of the pick face 150. This frees the layer board 102 in a front position but not a layer board 102 in a rear or replenishment position. As also discussed herein, the operator removes the layer board 102 from the pick or front position by pulling it straight out. The packages 130, 132 are restrained by a layer stop mechanism. As the cases 130, 132 come in contact with flow rollers, they flow down toward the front of the pick face 150, that is, the picking position 152. Operators continue to fulfill orders and pick from the pick position 152 until all the packages 130, 132 from the first layer board 102 (that was previously removed) have been removed and a particular pick location (e.g., pick location PL1) of the pick position 152 is empty. As described herein, with the particular pick location (pick location PL1) of the pick position 152 empty, the operator may manipulate the layer stop mechanism (e.g., raising, removing, pushing, pulling, or turning) to allow the laden layer board 102 in the rear or replenishment position to flow forward and into the pick or forward position 152. As the operator continues picking, the ASRS system replenishes the rear or replenishment position with a similarly laden layer board 102 (from the storage positions of the ASRS).

As illustrated in FIGS. 1A, 1B, and 2, and discussed herein, the individual pick locations (PL1, PL2, . . . PLn) of the pick face 150 may be monitored for empty back-up or replenishment positions by a storage and retrieval machine (SRM) 200 of the ASRS system. As discussed herein, while the SRM 200 carries out its storage and retrieval tasks in the ASRS system, sensors 202 affixed to the SRM 200 may be used to monitor the back-up or replenishment positions for empty positions. As illustrated in FIG. 2, the sensors 202 may be mounted to a frame of the SRM 200 such that particular sensors 202 may be used to sensor for the presence of layer boards 102 at a particular tier. FIG. 2 illustrates a trio of sensors 202 mounted on the SRM 200 in one of two positions (A, B) along a top, bottom, and middle edge of the SRM 200. For example, a top-most set of sensors, or a single sensor, may be positioned to monitor a top tier of the pick locations (PL1, PL2, . . . PLn) of the pick face 150. Similarly, a bottom-most set of sensors, or a single sensor, may be positioned to monitor a bottom tier of the pick locations (PL1, PL2, . . . PLn) of the pick face 150.

As illustrated in FIG. 2, an exemplary SRM 200 is equipped with sensors 202 that are positioned to sense the presence of a layer board 102 in the back-up or replenishment position. In an aspect of the present invention, the sensors 202 are proximity photo-eyes, cameras, or vision sensors. As illustrated in FIG. 2, the SRM 200 is equipped with a proximity photo-eye for each pick face tier (level) and side. The photo-eyes 202 may be attached at fixed positions to a cabinet or frame of the SRM 200 such that each photo-eye 202 is pointed at a particular pick face tier. The exemplary photo-eyes 202 are configured to detect whether a load is present or not present on the tier they are aimed at. As discussed herein, when the SRM 200 is in motion, the photo-eye 202 at each tier will scan each pick location (PL1, PL2, . . . PLn) that it passes, such that a controller 210 of the SRM 200 will generate a load present/not present output based on the sensor 202 output. As also illustrated in FIG. 2, the sensors 202 are positioned in one of two positions or orientations (A, B). When sensors 202 are in position A, the sensors 202 will be oriented horizontally aligned with the layer boards 102. When sensors 202 as in position B, the sensors 202 will be oriented under and looking up at the layer boards 102.

Figure 5:
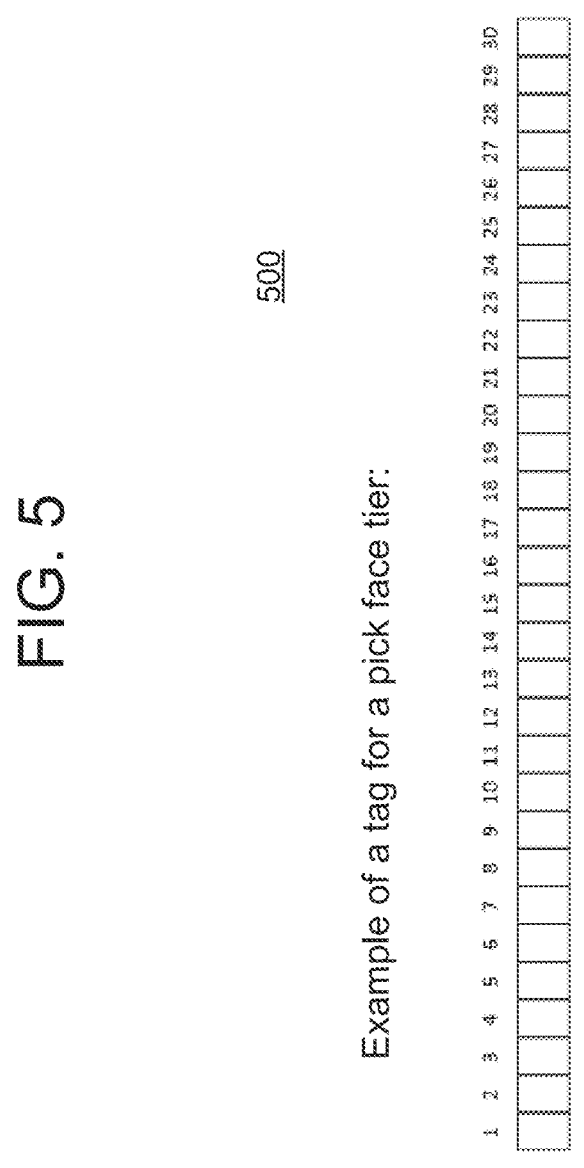

As discussed herein, the load present/not present output (as provided by the controller 210) may be configured to provide the status of each tier of each pick location (PL1, PL2, . . . PLn) of the pick face 150. In an aspect of the present invention, one or more character strings are added to the "command complete" message, which is sent by the controller 210 of the SRM 200 to a warehouse control system (WCS) each time the SRM 200 completes a command. This addition to the "command complete" message may consist of a tier status tag character string for each tier of each pick face (i.e., the right and left pick faces). The character string will have a character position for each pick location (PL1, PL2, . . . PLn) on the tier. FIG. 5 illustrates an example tag 500. The tag 500 in FIG. 5 illustrates the layout for a tag 500 for one pick face tier that has 30 pick locations (PL1, PL2, . . . PLn). The "command complete" message will have a tag 500 for each tier and each side (assuming the SRM 200 passes down an isle with pick faces 150 on either side of the SRM 200). If the target system has more or fewer pick locations, the length of the tags 500 may be varied accordingly. Alternatively, a tag 500 can be set for the size of the longest anticipated system and the unneeded character positions on any given system would always remain unused (blank) for that system.

Figure 3:
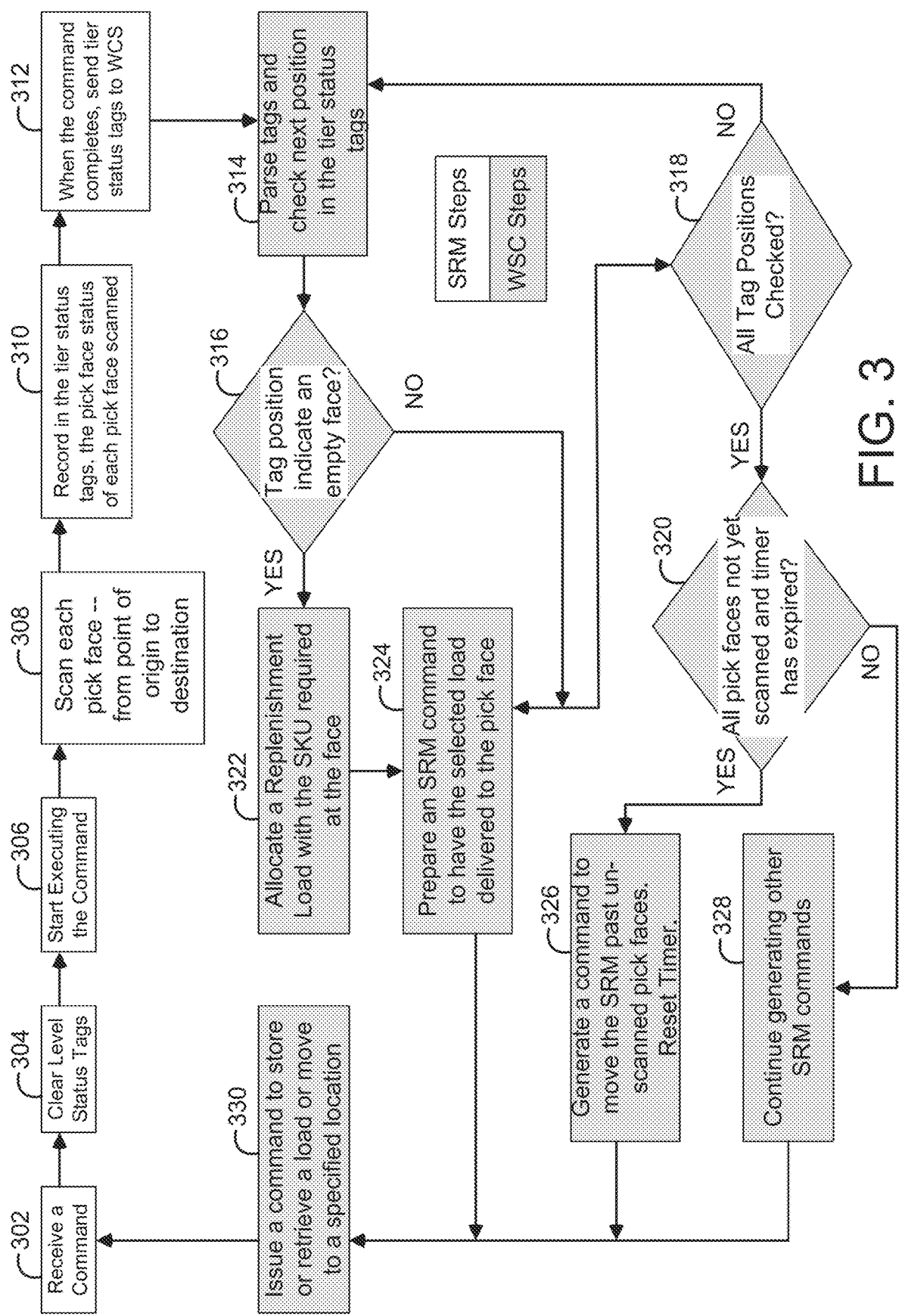
FIG. 3 illustrates steps to an automated replenishment method according to an embodiment of the present invention.
Figure 4:
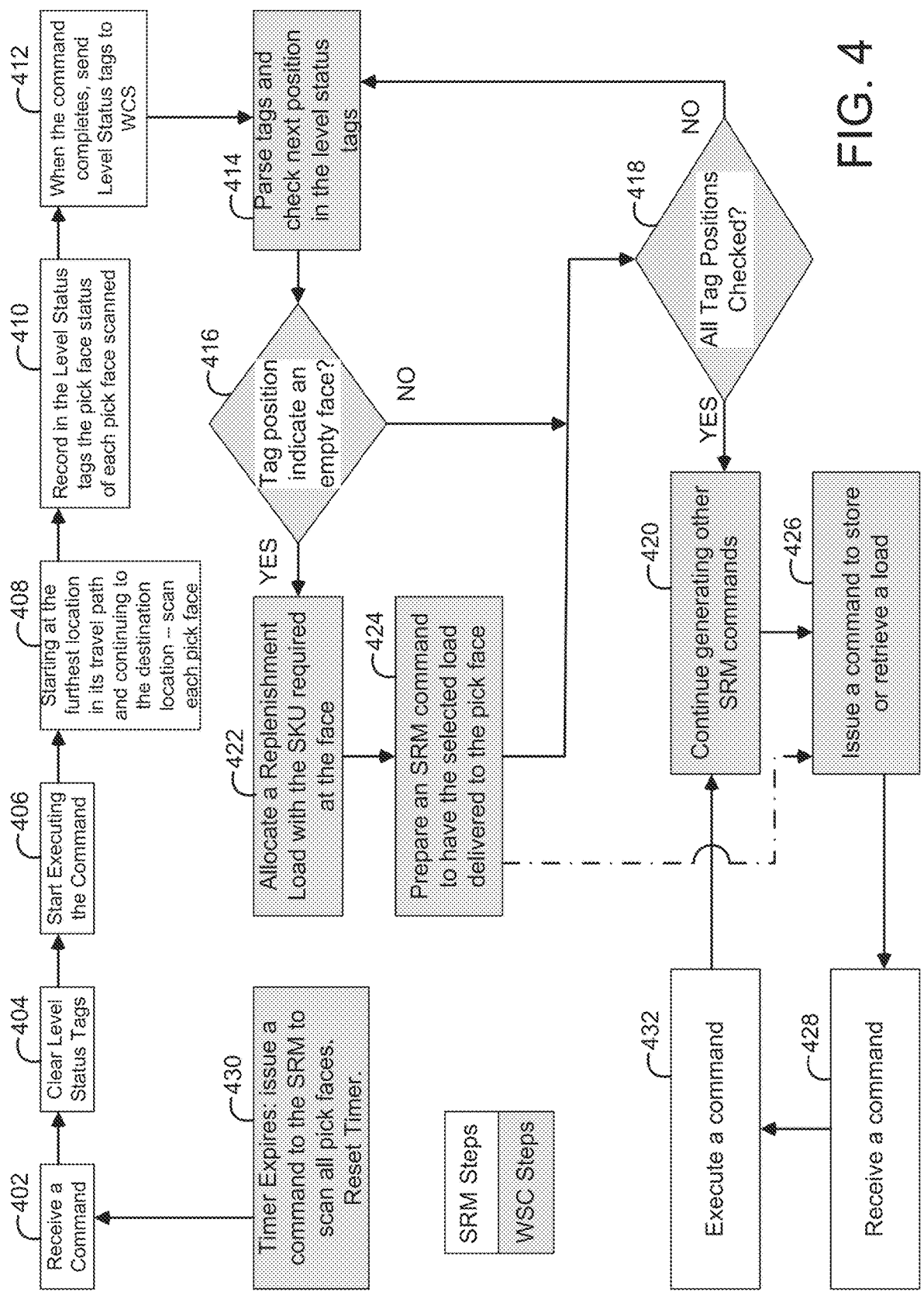
FIG. 4 illustrates steps to an alternative automated replenishment method according to an embodiment of the present invention.

As illustrated in FIGS. 3, 4, and 6, when an SRM 200 receives a command, it will blank fill all the positions of all of the tier status tags 500 (or a buffer that holds the data for the tier status tags 500). Using positioning coordinates provided by an encoder (not shown), as the SRM 200 moves, the controller 210 matches the output from a sensor 202 with the pick location (PL1, PL2, . . . PLn) that the sensor 202 is pointed at. If the sensor 202 indicates a load is present (by sensing the presence of a layer board 102), the SRM controller 210 will write an exemplary "L" for loaded into the position of the tier status tag 500 corresponding to that pick location (PL1, PL2, . . . PLn). If the sensor 202 indicates no load present, the SRM controller 210 will write an "E" for empty into the position of the tier status tag 500 corresponding to that pick location (PL1, PL2, . . . PLn). If there is an error at any given pick position or tier, the SRM controller 210 will write an "X" for unknown into that position or positions of the tier status tag 500 corresponding to that pick location (PL1, PL2, . . . PLn). These letters ("L" and "X") are exemplary in nature and different letters or numbers can be used to indicate each of the conditions.

FIG. 6 illustrates exemplary tag information that would be added to the "command complete" message for a system with three pick face tiers on each side of the SRM 200 and for a length of 30 pick locations (PL1, PL2, . . . PL30). The example illustrates exemplary data collected during a store command from a front input pickup and deposit (P&D) to a location at pick location 14. An exemplary P&D is a station where a load may be picked up from and/or deposited to. The six tags (Tags 1-6) illustrated in FIG. 6 indicate that the following pick positions are not occupied (by a layer board 102) and therefore, would require replenishment:

Pick location 10, Tier/Level 1, Left Side.
Pick location 5, Tier/Level 3, Left Side.
Pick location 2, Tier/Level 3, Right side.
Pick location 12, Tier/Level 3, Right side.

When the WCS receives a "command complete" message, it will process the information in the tier status tags 500. The WCS will parse each tier status tag until it detects an "E" in the string. When an "E" is detected, the WCS will use the position in the string to determine the pick location (PL1, PL2, . . . PLn) corresponding to the tier the tag 500 represents. The WCS will update a data structure which will record that tier and pick location as requiring replenishment.

The WCS will also update a new data structure which will be created to record the maximum and minimum pick location numbers (PL1, PL2, . . . PLn) that have been reported on through "command completion" messages during a given period of time. A time stamp value will indicate the start of that period (last time the values were cleared). FIG. 7A illustrates an example that indicates what those values would be after the traditional command discussed above has been completed. FIG. 7B illustrates how the values would be updated if the next command was a "store to pick location 21." FIG. 7C illustrates how the values would be updated if the WCS issues, and the SRM completes, a command to "store a stack of boards from a collector stack pick up and deposit (P&D) at a back of the aisle." Because the SRM 200 has covered the length of the rack (in carrying out this command), the WCS will clear the minimum and maximum pick location values and reset the time stamp.

If during the course of normal operations, the SRM 200 has not travelled past all the pick locations within an exemplary 15 minutes, the WCS will issue a "move" command to the SRM 200. If the SRM 200 has not covered the rear pick locations, the move will be to the furthest down aisle pickup or drop off location. However, if the SRM 200 has not covered the front pick locations, the move will be to the furthest up aisle pickup or drop off location at the front of the aisle. Once this move is completed, all pick locations (PL1, PL2, . . . PLn) will have been covered and the WCS will reset (clear) the Minimum and Maximum and reset the time stamp since last clear. In an aspect of the present invention, the number of minutes for this time period may be a user adjustable system parameter. There will be a minimum value (e.g., 10 minutes) to prevent the system from being set in such a way that the SRM 200 would be excessively commanded to move to one end or the other of the aisle.

If an "X" appears for any pick location position (PL1, PL2, . . . PLn) in a tag 500, the WCS will log an alarm specifying the error and the particular pick location and tier/level of where the error in trying to detect a load presence occurred.

If the SRM 200 is not detecting that a particular pick face location is empty when that location actually is empty, an exemplary WCS user interface function allows the operator to edit the location record (or other appropriate data structure) to indicate that the particular pick location PLn requires replenishment.

A normal or enhanced WCS user interface function may be used to enable or disable the retrieval to each and any specific pick location.

The user interface device screen user interface function (or other custom UI function) will provide the operator with the ability to turn on or off the automatic replenishment.

FIG. 3 illustrates the steps to an exemplary replenishment process. As discussed herein, particular ones of these steps are performed by the SRM 200, while other steps are performed by the WCS. In step 302 of FIG. 3, a command is received by the SRM 200 to store or retrieve a load, or move to a specified location. This command is sent by the WCS in step 330 of FIG. 3. In step 304 of FIG. 3, the SRM 200 clears the tier status tags. In step 306 of FIG. 3, the SRM 200 starts executing the command. In step 308 of FIG. 3, starting at the furthest pick location in its travel path and continuing to the destination location, the SRM 200 scans the tiers of each pick location (PL1, PL2, . . . PLn) of each pick face 150. The SRM 200 will scan and record the greatest distance travelled during a given command. For example, if the SRM 200 starts at pick location 5 where it just deposited a load and is commanded to store another load to pick location 17, the SRM 200 will pick up the next load from the input P&D and scan from pick location 1 to pick location 17. The SRM 200 will not scan from location 5 to the input P&D since that would result in a lesser scan encompassing only location 5 to location 1. In step 310 of FIG. 3, the SRM 200 records in the tier status tags 500 the pick face status of each pick location of each pick face scanned. As discussed herein, this includes each tier of each pick location of the pick face 150. In step 312 of FIG. 3, when the command completes, the SRM 200 sends the tier status tags 500 to the WCS.

In step 314 of FIG. 3, the WCS receives the tier status tags 500 and parses the tags 500 and checks the next position in the tier status tags 500. In step 316 of FIG. 3, the WCS determines whether a particular tag position (pick location PL1, PL2, . . . PLn) indicates an empty replenishment position. If YES, the process continues to step 322 of FIG. 3; if NO, the process continues to step 318 of FIG. 3. In step 318 of FIG. 3, the WCS determines whether all tag positions have been checked. If YES, the process continues to step 320 of FIG. 3; if NO, the process continues back to step 314 of FIG. 3.

When the process continues to step 322 of FIG. 3, the WCS allocates a replenishment load with the SKU required at the particular pick location PLn. If the WCS has already allocated a load for the empty pick location PLn, it will not allocate another. In step 324 of FIG. 3, the WCS prepares an SRM command to have the selected load delivered to the pick location PLn. The process continues to step 330 of FIG. 3, where the WCS issues a command to the SRM 200 to store or retrieve a load or move to a specified pick location PLn.

When the process continues to step 320 of FIG. 3, the WCS determines whether all the pick locations have not yet been scanned and whether the timer has expired. If YES (i.e., all of the pick locations have NOT yet been scanned and/or the timer has expired), the process continues to step 326 of FIG. 3. If NO (i.e., all the pick locations have been scanned or the timer has not yet expired), the process continues to step 328 of FIG. 3. In step 326 of FIG. 3, the WCS generates a command to move the SRM 200 past the un-scanned pick locations and resets the timer. The process then continues to step 330. In step 328 of FIG. 3, the WCS continues generating other SRM commands and continues to step 330.

FIG. 4 illustrates the steps to an alternate replenishment process. In this variant, the SRM 200 will be directed to perform normal retrieving and storing until a timer expires or another event triggers a scan of the pick locations (PL1, PL2, . . . PLn) of the pick face(s) 150. When the timer expires, the SRM 200 is directed to perform a scan of all of the pick locations. The timer (or other event) is reset and the scan process will be again triggered each time the timer (or other event) expires. Therefore, steps 402 through 412 are the same as steps 302 through 312, except that step 402 is received from step 430 which includes an action commencing when a timer expires, with the WCS issuing a command to the SRM 200 to scan all pick locations, as well as resetting the timer.

Similar to FIG. 3, in step 414 of FIG. 4, the WCS receives the tier status tags 500 and parses the tags 500 and checks the next position in the tier status tags 500. While in step 416 of FIG. 4, the WCS also determines whether a tag position indicates an empty replenishment position at a particular pick location (PLn). If YES, the process continues to step 422 of FIG. 4; if NO, the process continues to step 418 of FIG. 4. In step 422 of FIG. 4, the WCS allocates a replenishment load with the SKU required at the pick face (for the particular pick location PLn). The process continues to step 424 of FIG. 4, where the WCS prepares an SRM command to have the selected load delivered to the pick face. From here, the process goes to step 418 AND step 426 of FIG. 4. In step 418 of FIG. 4, the WCS again determines whether all tag positions have been checked. If YES, the process now proceeds to step 420 of FIG. 4; if NO, the process again continues back to step 414 of FIG. 4.

In step 420 of FIG. 4, the WCS continues generating other SRM commands. The process proceeds to step 426 of FIG. 4, where the WCS issues a command to the SRM 200 to store or retrieve a load. In step 428 of FIG. 4, the SRM 200 receives a command. In step 432 of FIG. 4, the SRM 200 executes a command. As illustrated in FIG. 4, the process continues back to step 420 and continues looping through steps 420, 426, 428, and 432 until the timer expires in step 430.

In a further aspect of the present invention, it is possible to control exemplary loads of almost any weight from about 50 pounds to 1000 pounds or more. Previous designs, for example, were not as able to handle heavier loads.

As discussed herein, a constraining and braking mechanism (also referred to as a lever arm assembly) 600 in accordance with the present invention provides for improved control and braking of package loads (see FIGS. 1C, 1D, 1E, and 8A). As used herein, package loads are inventory or packages 130, 132 stacked on layer boards 102. The constraining and braking mechanism (lever arm assembly) 600 constrains a rear-positioned layer board 102 and its packages 130, 132, referred to herein as a replenishment load 110, while packages 130, 132 are removed from a forward-positioned layer board 102, referred to herein as a forward load 120. Once the packages 130, 132 of the forward load 120 (or a portion of the packages 130, 132) are removed, the forward-positioned layer board 102 may be removed while the replenishment load 110 is held in position by the lever arm assembly 600. With the forward-positioned layer board 102 removed, what packages 130, 132 remain are held in position by the retainer bar (602) (see FIG. 10A). Once the forward load 120 is removed (all the packages 130, 132 have been picked and the layer board 102 removed), the lever arm assembly 600 may be manipulated to release the replenishment load 110 and allow the rear-positioned layer board 102 (of the replenishment load 110) to controllably slide forward into the forward picking position and become the forward load 120, ready for picking. As discussed herein, the rear-positioned layer board 102 of the replenishment load 110 is controllable slid forward through the use of a braking function of the lever arm assembly 600. As discussed herein, a lever handle 610 of the lever arm assembly 600 is manipulated to apply a braking function.

Figure 1C:
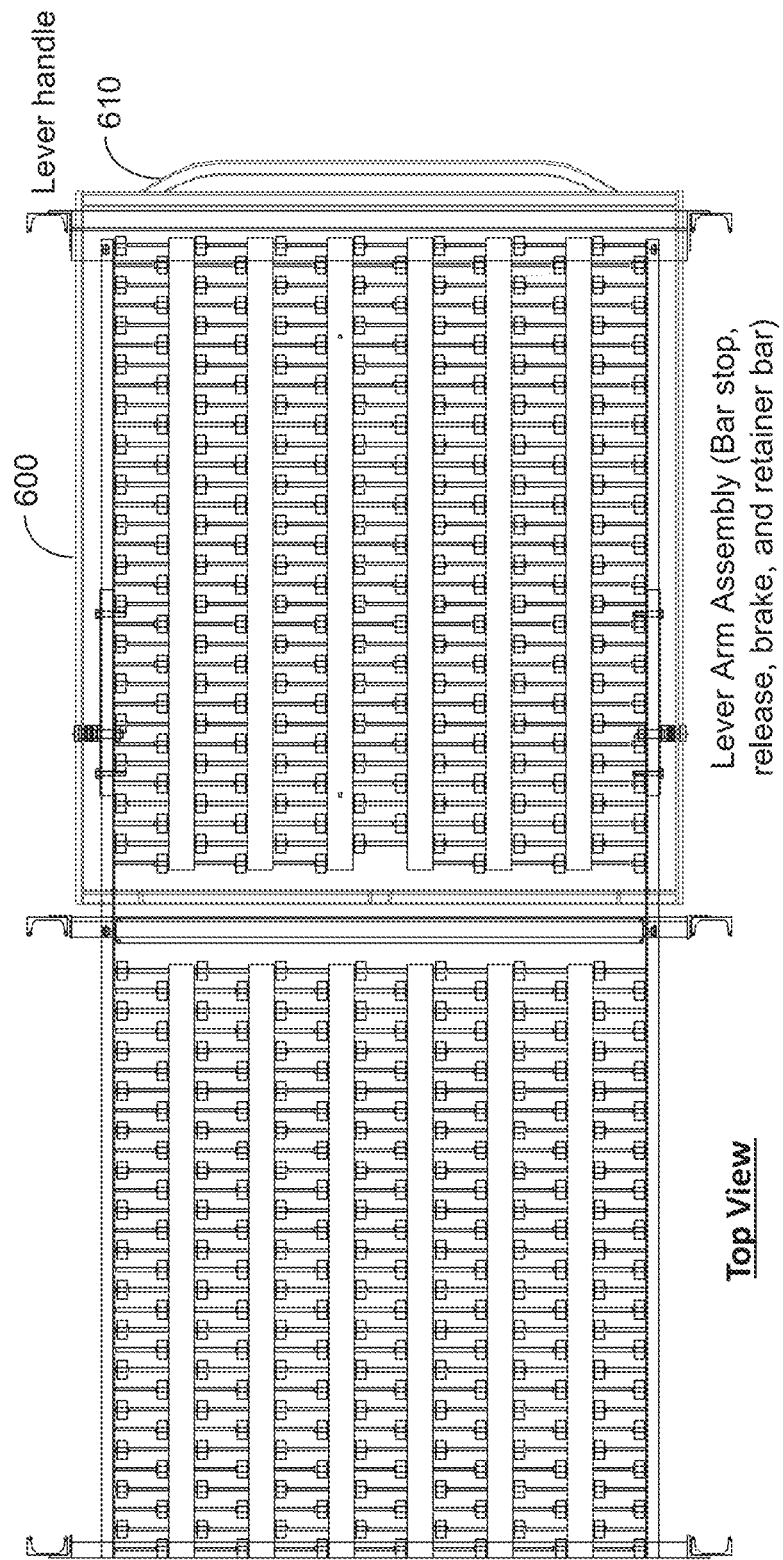
FIG. 1C is a top plane view of a double deep flow station of the order fulfillment system of FIG. 1A equipped with an exemplary lever arm assembly for controlling package flow through the flow station according to an embodiment of the present invention.
Figure 1D:
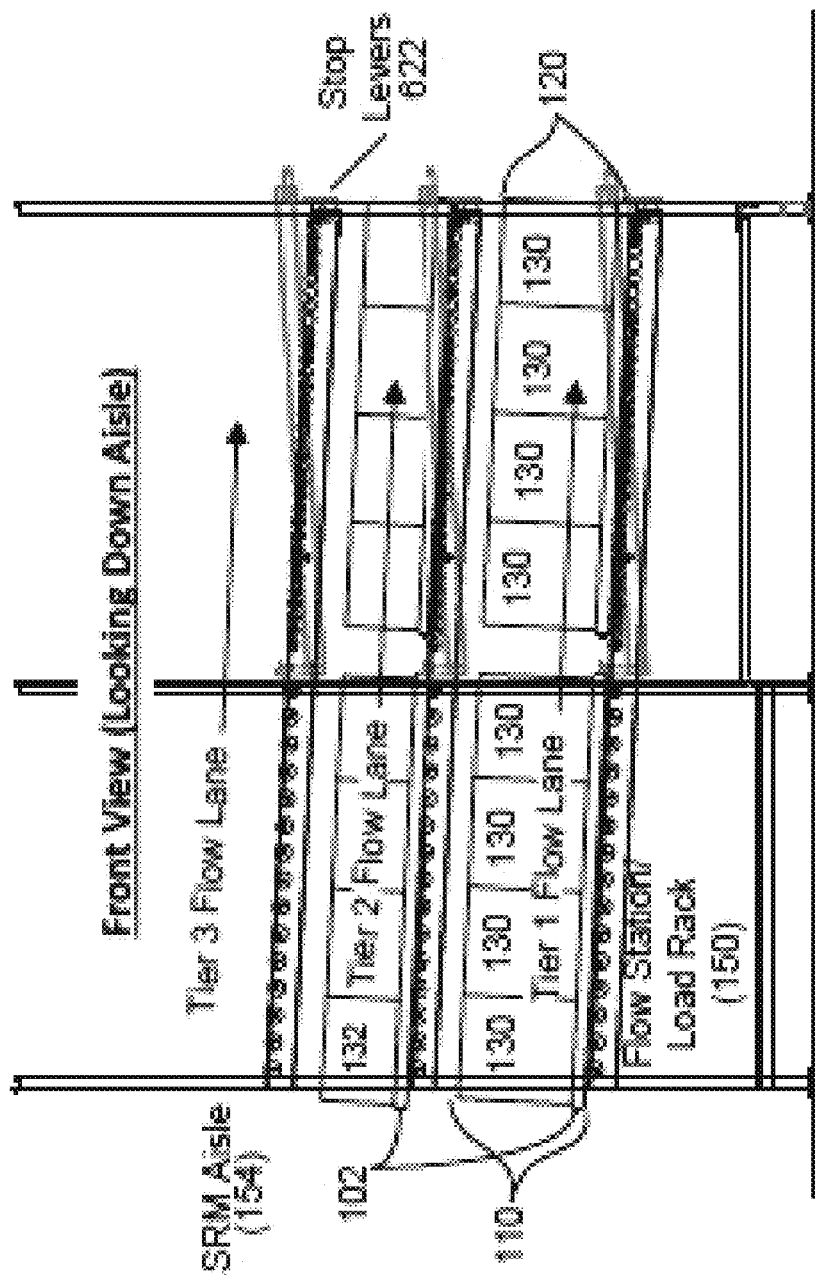
FIG. 1D is a front plane view of a double deep flow station of the order fulfillment system of FIG. 1A equipped with the exemplary lever arm assembly of FIG. 1C according to an embodiment of the present invention.

In an aspect of the present invention, as illustrated in FIGS. 1A and 1D, the three tiers of the multi-tiered flow station or load rack of the pick face 150 are canted. As illustrated in FIG. 1D, each tier is canted a desired angle to provide for a flow lane. In an aspect of the present invention, the flow lanes of the tiers may be declined approximately 3 degrees, with a ⅞ inch drop from the rear layer board position to the front layer board position.

Figure 1E:
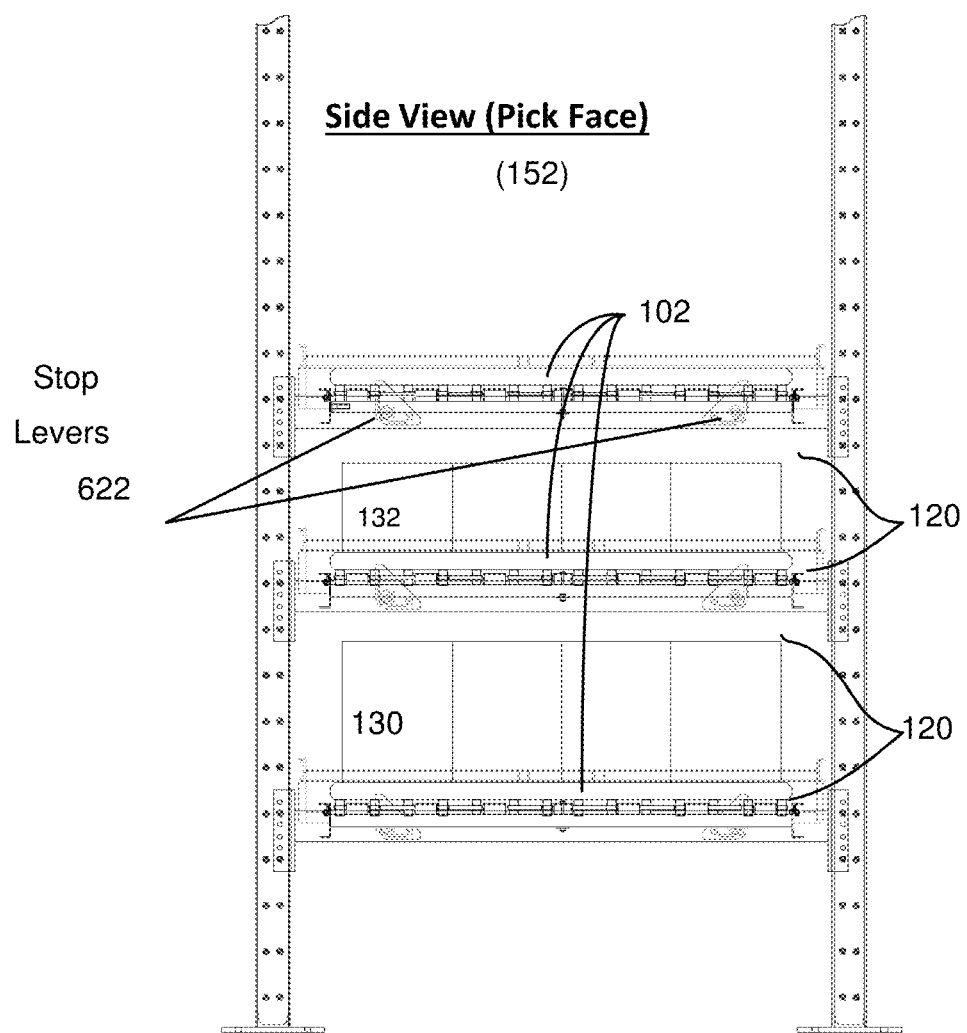
FIG. 1E is a side plane view of a pick position of the order fulfillment system of FIG. 1A equipped with the lever arm assembly of FIG. 1C according to an embodiment of the present invention.

In an aspect of the present invention, each tier has a different height clearance. As illustrated in FIGS. 1D and 1E, a lowest, first tier may have a greater height clearance than a middle, second tier. In a further aspect of the present invention, the first tier clearance at the SRM aisle 154 is 15 inches, the second tier clearance at the SRM aisle 154 is 10 inches, while the third tier at the SRM aisle 154 has a clearance of 28 inches. In a further aspect of the present invention, the first tier is configured to clear packages 130 with a maximum height of 13 inches, the second tier is configured to clear packages 132 with a maximum height of 8 inches, while the third tier is configured to clear packages with a maximum height of 26 inches.

As illustrated in FIG. 1C, each tier's flow lane comprises a plurality of rollers that provide support for layer boards 102 as well as enable the flow of those layer boards 102 towards the picking position 152 of the pick face 150. As illustrated in FIG. 1C, the rollers are arranged across substantially the entire surface of the flow lane of each tier such that a layer board 102 is fully supported across the entire surface of the layer board 102. As also illustrated in FIGS. 1A, 1D and 2, an opposite side of the pick face 150 (opposite the picking position 152), is a storage resource management (SRM) tool isle 154. The SRM (running in the SRM isle 154) resupplies a new replenishment load 110 when the rear position of the flow station/load rack of the pick face 150 is empty (because the replenishment load 110 has slid forward to become the forward load 120).

As illustrated in FIGS. 8A, 8B, 8C, and 8D, a lever arm assembly 600 includes a retainer bar 602 and a bar stop 604. The bar stop 604 further includes a brake pad 606 positioned in the middle of the bar stop 604. Cross members of the lever arm assembly 600 include pivot points 608. As discussed herein, the pivot points 608 are selected such that gravity will hold the lever arm assembly 600 in a "holding" position. When the lever arm assembly 600 is lifted up by the handle 610, the lever arm assembly 600 rotates the bar stop 604 out of the way of the replenishment load 110. As also discussed herein, pushing down on the handle 610 will increasingly engage a "braking" via the brake pad 606 pressing into the underside of the sliding rear-positioned layer board 102 as it slides forward across the rollers of the flow lane.

FIGS. 9A, 9B, 10A, 10B, 11A, and 11B illustrate a sequence of operation of the lever arm assembly 600 to enable the controlled flow of layer boards 110, 120 down the flow lanes of the tiers of the pick face 150 and to a picking position 152. In step 1 of FIG. 9A, the bar stop 604 of the lever arm assembly 600 is positioned such that the bar stop 604 restrains the replenishment load (rear-positioned layer board 102 and packages 130, 132) from flowing forward across the rollers. As illustrated in FIG. 9A, the lever arm assembly 600 rests against the bottom of the flow rail. In step 2 of FIG. 9B, the lever arm assembly 600 is still in a resting position. As further illustrated in step 2 of FIG. 9B, stop levers 622, located on the pick face side are in an "up" resting position and restrain the layer board 102 of the forward load 120 from moving forward. The stop levers 622 are also illustrated in FIG. 1E. A pair of the stop levers 622 are positioned at each tier of the pick face to restrain the layer board 102 of the forward load 120.

In step 2 of FIG. 9B, while the lever arm assembly 600 remains in a resting position, the stop levers 622 may be manually rotated down to allow the forward load 120 to flow forward freely. The forward-positioned layer board 102 slides under the lever arm assembly 600 while the packages 130, 132 of the forward load 120 are retained by the retaining bar 602 of the lever arm assembly 600 (see FIG. 9B).

Figure 10A:
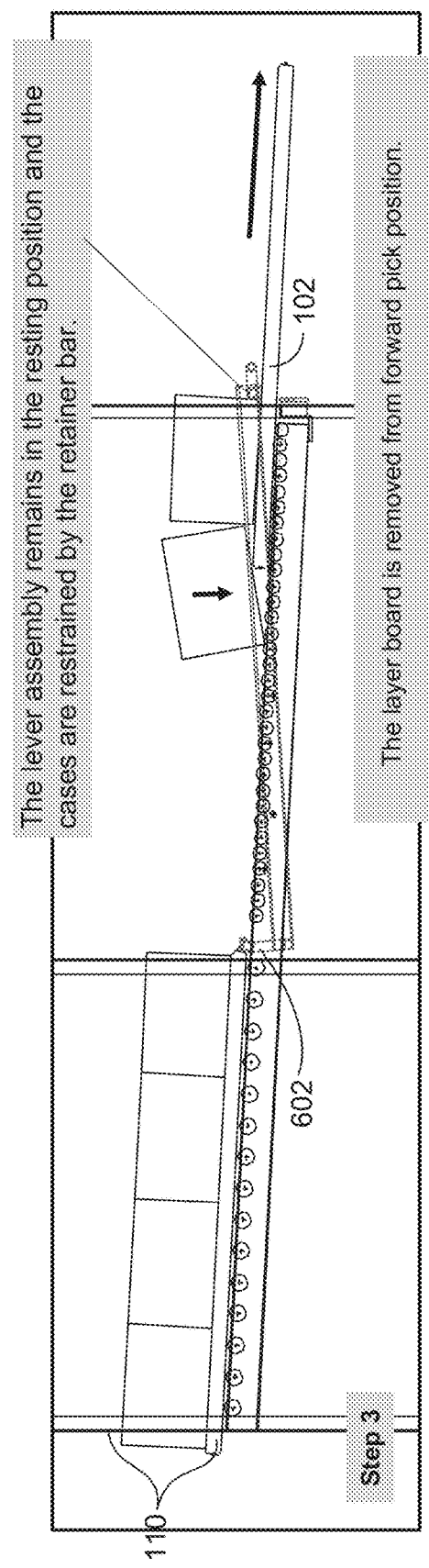

In step 3 of FIG. 10A, while the lever arm assembly 600 remains in a resting position, the retaining bar 602 of the lever arm assembly 600 restrains the packages of the forward load 120 from moving forward with the layer board 102. As illustrated in FIG. 4, in step 3, the layer board 102 may be manually pulled or removed from the forward pick position and the remaining packages of the forward load are allowed to fall upon the case flow rails (rollers) to slide towards the picking position 152.

Figure 10B:
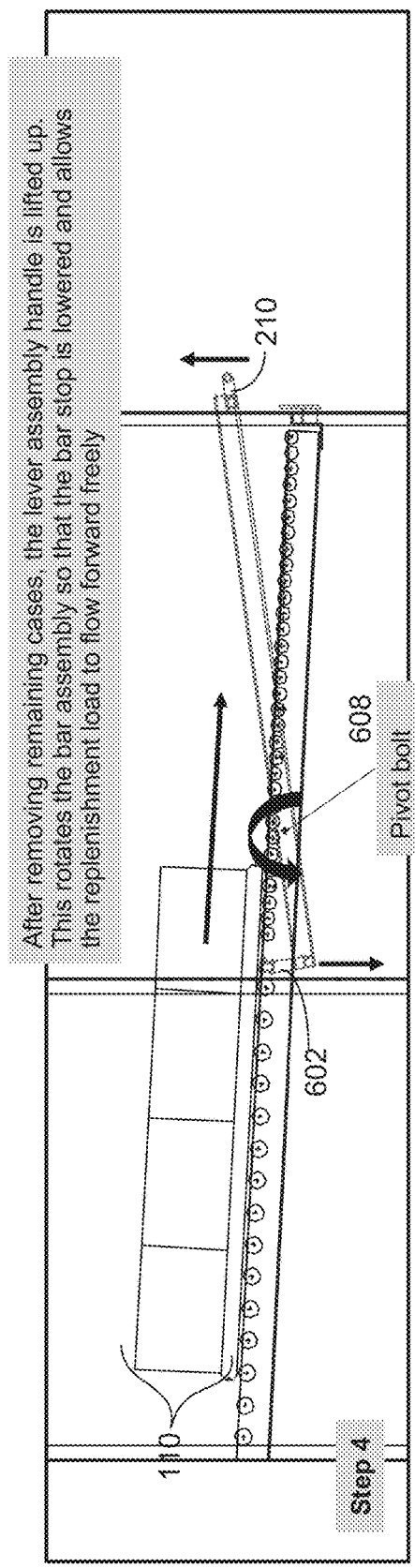

In step 4, illustrated in FIG. 10B, after an operator removes the remaining packages of the forward load 120, the handle 610 of the lever arm assembly 600 is lifted up. Lifting the handle 610 causes the lever arm assembly 600 to rotate (pivot) about the pivot points 608. As illustrated in FIG. 4, in step 4, rotating the lever arm assembly 600 causes the bar stop 604 to be lowered and the replenishment load 110 to flow forward freely to the pick position (152).

In step 5 of FIG. 11A, as the replenishment load 110 continues to flow forward, a pick operator may push down on the handle 610 of the lever arm assembly 600 to engage the brake pad 606 against the bottom of the layer board 102 of the replenishment load 110 as it slides forward. In an aspect of the present invention, by varying the pressure exerted on the handle 610 of the lever arm assembly 600, the speed of the descending replenishment load 110 may be controlled.

In step 6 of FIG. 11B, as the replenishment load 110 flows past and beyond the brake pad 606, the pick operator may release the handle 610 and the lever arm assembly 600 will naturally rotate back to its resting position (due to gravity). The replenishment load 110, without further braking restraints, is allowed to flow freely for the last few inches until it stops against the stop levers 622 and the retaining bar 602 of the lever arm assembly 600.

Figure 12:
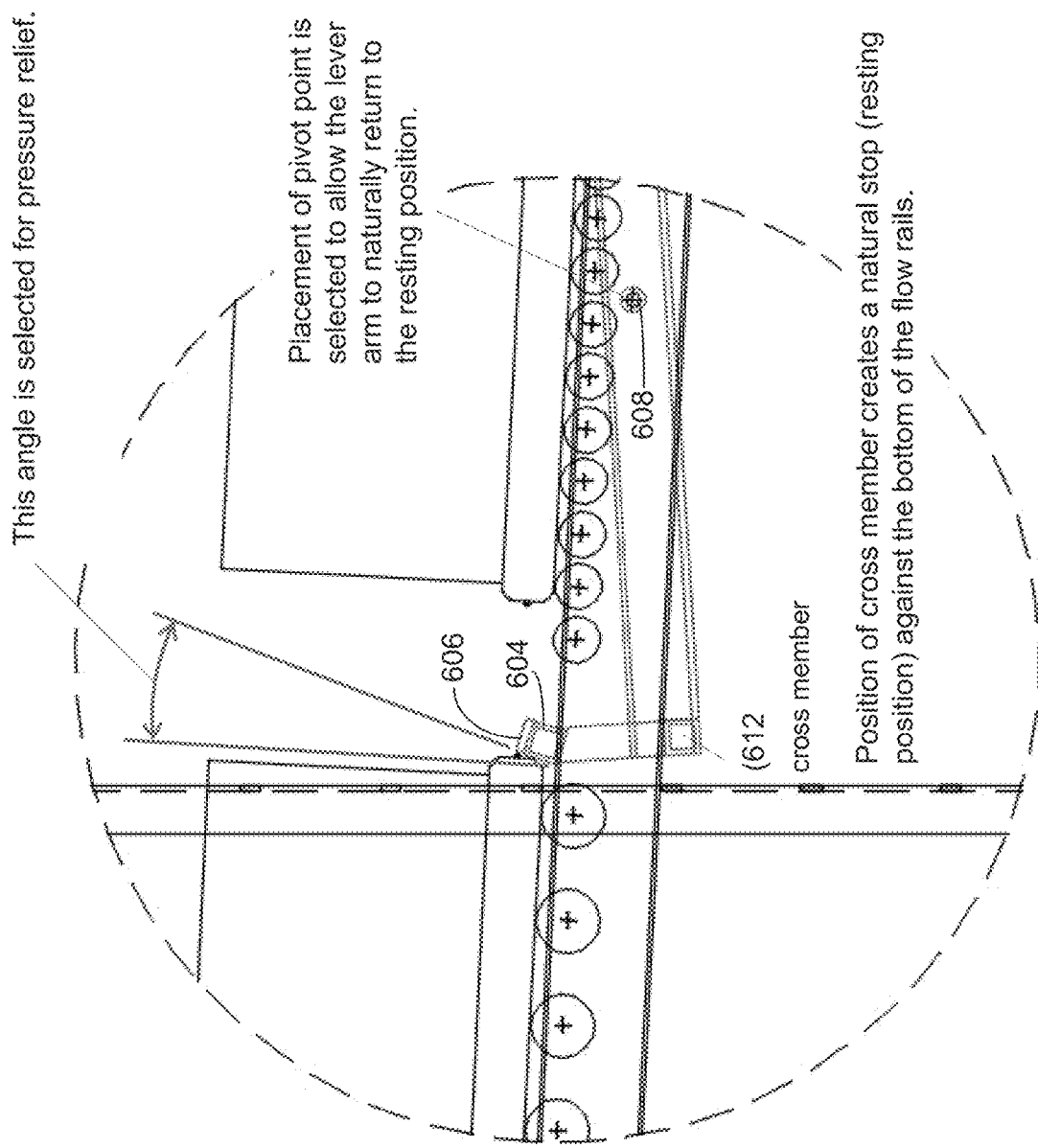
FIG. 12 is a schematic diagram of a side view of the lever arm of FIG. 9A implemented in a loading rack according to an embodiment of the present invention.

As illustrated in FIG. 12, the bar stop 604 (and brake pad 606 hereupon) is positioned at an angle such that the bar stop 604 naturally gives pressure relief as the bar stop 604 is lowered, making it easier to release the replenishment load 110. This is an improvement over a straight angle which would increase the pressure against the replenishment load 110 as the bar stop 604 is lowered. As also illustrated in FIG. 12, the pivot point 608 is placed to ensure that the lever arm assembly 600 naturally returns to a resting position (due to gravity) when not being manually manipulated. Lastly, as also illustrated in FIG. 12, a cross member 612 connecting to the bar stop 604 is positioned to create a natural stop (resting position) against the bottom of the flow rails.

Figure 13:
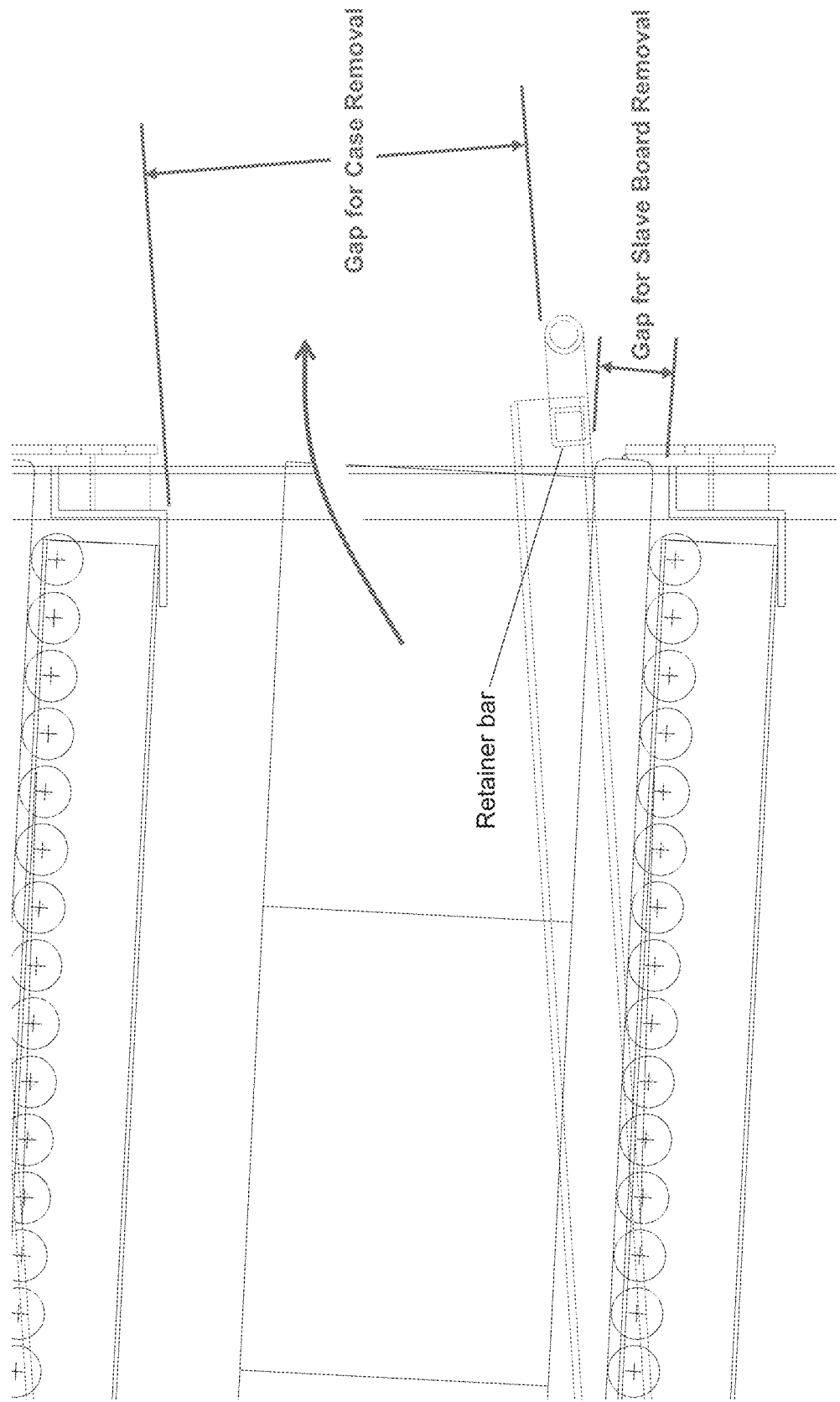
FIG. 13 is a schematic diagram of a side view of the pick face end of the loading rack according to an embodiment of the present invention.

As illustrated in FIG. 13, the lever arm assembly 600 is designed so that a gap (for layer board removal) underneath the retainer bar 602 is large enough to allow the layer boards 102 to flow freely underneath the retainer bar 602, while still keeping the retainer bar 602 low enough to allow the removal of the packages or cases above it for picking. As further illustrated in FIG. 13, the height of the retainer bar 602 (and the distance to the above tier) defines a gap for package/case removal.

Figure 14:
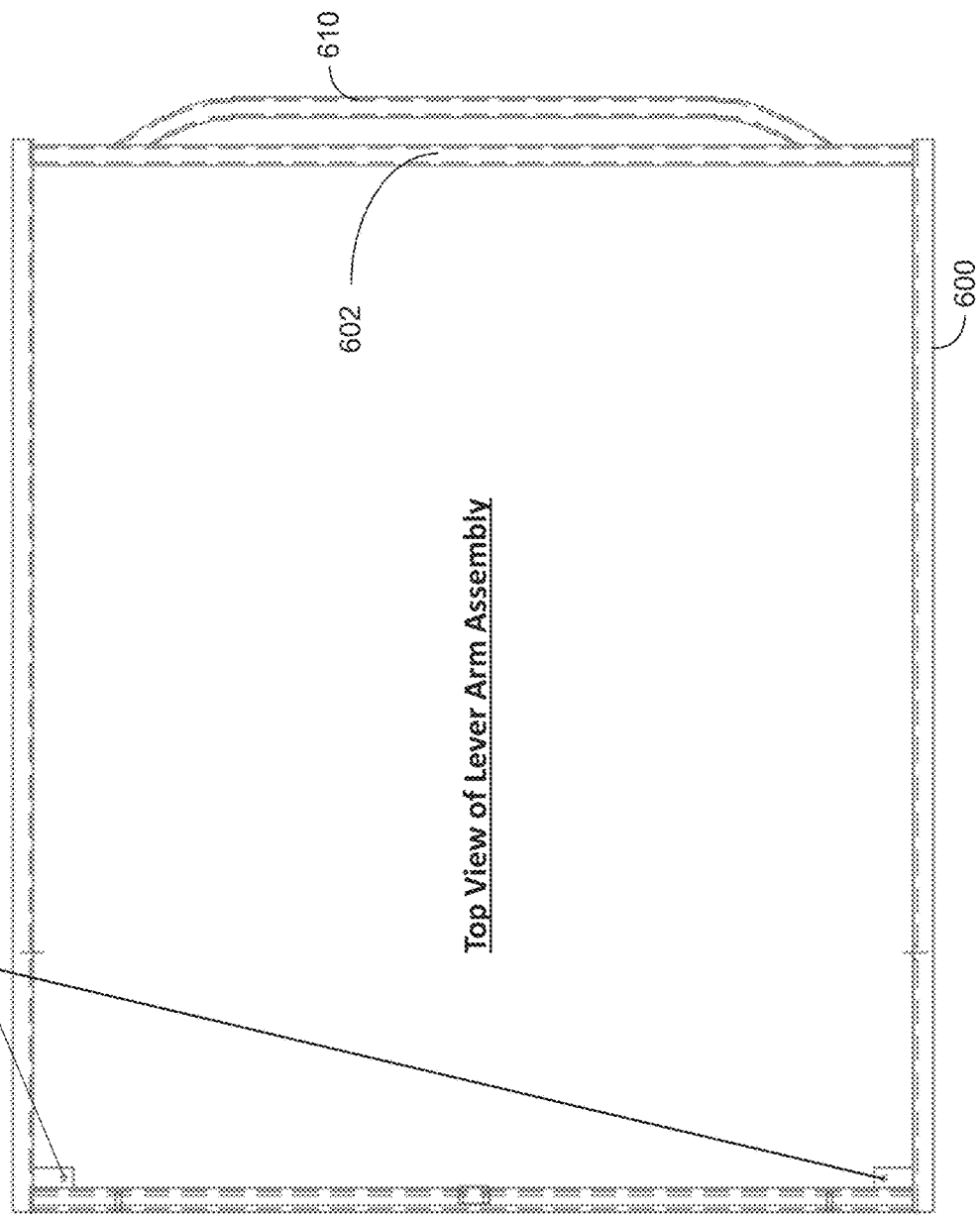
FIG. 14 is a schematic diagram of a top plan view of the tier arm assembly of FIG. 9 according to an embodiment of the present invention.

FIG. 14 further illustrates features of the lever arm assembly 600. For example, the handle 610 is formed to be very prominent such that an operator may safely operate the lever arm assembly 600 while keeping their hands away from the retainer bar 602 (a potential pinch point). As also illustrated in FIG. 14, threaded holes for jack screws are positioned to allow for the fine tuning of the installation of the lever arm assembly 200 in the load rack of the picking system 100.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A load management system configured to replenish pick locations in a pick face of a warehouse, the load management system comprising:

a storage and retrieval machine (SRM) configured to traverse an aisle of a warehouse, wherein the SRM comprises a monitoring system configured to monitor a replenishment position of each pick location of a pick face of the warehouse as the SRM traverses down the aisle from pick location to pick location, wherein each pick location comprises a plurality of tiers, and wherein the monitoring system is configured to monitor replenishment positions of each pick location tier of the pick face;
   wherein the monitoring system is configured to transmit a load present/not present message to the load management system indicating which ones of the replenishment positions of each of the pick location tiers are empty; and
   wherein the SRM is configured to deliver a selected replenishment package load comprising a plurality of packages on a layer board or pallet to a pick location that is indicated as empty in the message.

2. The load management system of claim 1, wherein the SRM comprises a sensor for each tier of the pick face, wherein each sensor is configured to detect the presence of package loads in corresponding replenishment positions, wherein each sensor is attached at fixed positions to a frame of the SRM such that each sensor is oriented to point at a particular pick face tier, wherein each sensor is either oriented horizontally aligned with the particular pick face tier or oriented under and looking up at the particular pick face tier, and wherein the SRM is configured to generate a load present/not present message for each tier of the pick face.

3. The load management system of claim 2, wherein a sensor is one of a proximity photo-eye, a camera, and a vision sensor.

4. The load management system of claim 1, wherein each of the plurality of tiers comprises a first tier comprising a flow lane configured to direct the motion of package loads sliding down the flow lane to the respective pick location of the pick face, wherein the first tier comprises a lever arm assembly configured to selectively constrain and brake the motion of the package loads sliding down the flow lane, wherein the flow lane is configured to support a replenishment load that is retained in position by the lever arm assembly, and further configured to support a forward load that is also restrained in position by the lever arm assembly, wherein the forward load is in a the picking position and individual packages of the forward load are in position for picking by an operator, and wherein the replenishment load position is behind the forward load position.

5. The load management system of claim 4, wherein the lever arm assembly comprises a retainer bar configured to constrain the forward load in position, and wherein the retainer bar is defined by a rear arm of the lever arm assembly.

6. The load management system of claim 4, wherein the lever arm assembly comprises a bar stop configured to constrain the replenishment load in position, wherein the bar stop is defined by a rear arm of the lever arm assembly, and wherein the bar stop is angled with respect to the lever arm assembly to provide pressure relief when lowering the bar stop.

7. The load management system of claim 6, wherein the lever arm assembly comprises a handle, wherein the bar stop comprises a brake pad, and wherein the lever arm assembly is further configured such that when the forward load has been removed from the flow lane lifting up on the handle rotates the bar stop out of the way of the replenishment load, allowing the replenishment load to flow freely forward down the flow lane and towards the pick face.

8. The load management system of claim 7, wherein the lever arm assembly is further configured such that when the replenishment load is flowing forward across the brake pad, pushing down on the handle of the lever arm assembly pushes the brake pad against the underside of the replenishment load and controls the descent of the replenishment load down the flow lane and towards the pick face.

9. The load management system of claim 8, wherein the lever arm assembly comprises a pivot that pivotally mounts the lever arm assembly at a location that ensures that the lever arm assembly returns to a resting position due to gravity when not being manually manipulated.

10. The load management system of claim 4 further comprising at least a second tier and a third tier, each comprising a corresponding flow lane, wherein the second tier is above the first tier, and wherein the third tier is above the second tier.

11. The load management system of claim 10, wherein a first height clearance between the first tier and the second tier is shorter than a second height clearance between the second tier and the third tier.

12. The load management system of claim 1, wherein the SRM comprises a controller configured to receive sensor output and in response generate the load present/not present message.

13. The load management system of claim 1 further comprising a warehouse control system configured to select a replenishment package load for the SRM to deliver, as defined by the message received from the SRM.

14. The load management system of claim 13, wherein the warehouse control system comprises a timer, and wherein the warehouse control system is configured to issue a command to the SRM to scan all pick locations of the pick face when the timer expires and there are still un-scanned pick locations.

15. The load management system of claim 1, wherein the load present/not present message is an array configured to hold an indicator for each pick location of a pick face tier, wherein the indicator is configured to indicate whether the corresponding replenishment position is empty, full, or an error indicator when an empty or full indication cannot be made.

16. A method for replenishing pick locations in a pick face of a warehouse, the method comprising:
   traversing, with a storage and retrieval machine (SRM), an aisle of a warehouse, such that the SRM passes from pick location to pick location of a pick face of the warehouse as the SRM traverses the aisle, wherein each pick location comprises a plurality of tiers;
   monitoring, with a monitoring system of the SRM, replenishment positions of each pick location tier of the pick face as the SRM traverses down the aisle from pick location to pick location;
   transmitting a load present/not present message to a load management system indicating which ones of the replenishment positions of each of the pick location tiers are empty; and
   delivering, with the SRM, a selected replenishment package load comprising a plurality of packages on a layer board or pallet to a pick location that is indicated as empty in the message.

17. The method of claim 16, wherein generating, with the SRM, a load present/not present message comprises generating, with the SRM, a load present/not present message for each tier of the pick face, as determined by sensors, each sensor configured to detect the presence of package loads in corresponding replenishment positions.

18. The method of claim 17, wherein the load present/not present message is an array configured to hold an indicator for each pick location of a pick face tier, wherein the indicator is configured to indicate whether the corresponding replenishment position is empty, full, or an error indication when an empty or full indication cannot be made.

19. The method of claim 16 further comprising selecting a replenishment package load for the SRM to deliver, as defined by the message received from the SRM.

20. The method of claim 16 further comprising issuing a command to the SRM to scan all pick locations of the pick face when a selected period of time elapses and there are un-scanned pick locations, wherein the selected period of time is no less than a selected period of time.

21. A load management system configured to replenish pick locations in a pick face of a warehouse, the load management system comprising:
   a first tier comprising a flow lane, wherein the flow lane comprises rollers configured to roll under and direct the motion of package loads sliding down the flow lane to a picking position of the pick face, wherein a package load comprises a layer board and a plurality of packages resting on the layer board;
   wherein the first tier further comprises a lever arm assembly configured to selectively constrain and brake the motion of package loads sliding down the flow lane;
   wherein the flow lane is configured to support a replenishment load that is constrained in position by the lever arm assembly, and further configured to support a forward load that is also constrained in position by the lever arm assembly, wherein the forward load is in the picking position and individual packages of the forward load are in position for picking by an operator, and wherein the replenishment load position is behind the forward load position.

22. The load management system of claim 21, wherein the lever arm assembly comprises a retainer bar configured to constrain the forward load in position, and wherein the retainer bar is defined by a rear arm of the lever arm assembly.

23. The load management system of claim 21, wherein the lever arm assembly comprises a bar stop configured to constrain the replenishment load in position, wherein the bar stop is defined by a rear arm of the lever arm assembly, and wherein the bar stop is angled with respect to the lever arm assembly to provide pressure relief when lowering bar stop.

24. The load management system of claim 23, wherein the lever arm assembly comprises a handle, wherein the bar stop comprises a brake pad, and wherein the lever arm assembly is configured such that when the forward load has been removed from the flow lane, lifting up on the handle rotates the bar stop out of the way of the replenishment load, allowing the replenishment load to flow freely forward down the flow lane and towards the pick face.

25. The load management system of claim 24, wherein the lever arm assembly is configured such that when the replenishment load is flowing forward across the brake pad, pushing down on the handle of the lever arm assembly pushes the brake pad against the underside of the replenishment load, controlling the descent of the replenishment load down the flow lane and towards the pick face.

26. The load management system of claim 25, wherein the lever arm assembly comprises a pivot that pivotally mounts the lever arm assembly at a location that ensures that the lever arm assembly returns to a resting position due to gravity when not being manually manipulated.

27. The load management system of claim 21 further comprising at least a second tier and a third tier, each tier comprising a corresponding flow lane, wherein the second tier is above the first tier, and wherein the third tier is above the second tier.

28. The load management system of claim 27, wherein a first height clearance between the first tier and the second tier is shorter than a second height clearance between the second tier and the third tier.

* * * * *

UNITED STATES PATENT AND TRADEMARK OFFICE
CERTIFICATE OF CORRECTION

PATENT NO. : 11,100,460 B2
APPLICATION NO. : 16/361892
DATED : August 24, 2021
INVENTOR(S) : Criston S. Stevens et al.

Page 1 of 1

It is certified that error appears in the above-identified patent and that said Letters Patent is hereby corrected as shown below:

In the Claims

Column 13
Line 40, Claim 4, delete "the" after "in a"

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*